US006542228B1

United States Patent
Hartog

(10) Patent No.: US 6,542,228 B1
(45) Date of Patent: Apr. 1, 2003

(54) OPTICAL TIME DOMAIN REFLECTOMETRY METHOD AND APPARATUS

(75) Inventor: Arthur Harold Hartog, Southampton (GB)

(73) Assignee: York Sensors Limited, Hants (GB)

( * ) Notice: Subject to any disclaimer, the term of this patent is extended or adjusted under 35 U.S.C. 154(b) by 0 days.

(21) Appl. No.: 09/331,903

(22) PCT Filed: Jan. 7, 1998

(86) PCT No.: PCT/GB98/00028

§ 371 (c)(1),
(2), (4) Date: Jun. 28, 1999

(87) PCT Pub. No.: WO98/30881

PCT Pub. Date: Jul. 16, 1998

(30) Foreign Application Priority Data

Jan. 8, 1997 (GB) ............................................. 9700269

(51) Int. Cl.[7] ............................................... G01N 21/00
(52) U.S. Cl. ......................................... 356/73.1; 385/12
(58) Field of Search ........................ 385/12, 13, 27–31,
385/14, 38, 39, 123, 125–127; 359/179,
110; 356/44, 73.1; 250/227.18

(56) References Cited

U.S. PATENT DOCUMENTS

| 5,285,305 A | * | 2/1994 | Cohen et al. | 359/110 |
|---|---|---|---|---|
| 5,363,463 A | * | 11/1994 | Kleinerman | 385/123 |
| 5,579,421 A | * | 11/1996 | Duvall et al. | 385/14 |
| 5,592,282 A | * | 1/1997 | Hartog | 356/44 |
| 5,778,016 A | * | 7/1998 | Sucha et al. | 372/38 |
| 5,808,761 A | * | 9/1998 | Stewart | 359/110 |
| 5,995,687 A | * | 11/1999 | White | 385/14 |
| 6,301,036 B1 | * | 10/2001 | Spencer | 359/179 |

FOREIGN PATENT DOCUMENTS

EP  0 636 868 A1  7/1994

OTHER PUBLICATIONS

Barnoski, M. K. & Jensen, S.M., Applied Optics 1976, vol. 15, pp. 2112–15.
Hartog, A. H., Journal of Lightware Technology, 1983, vol. LT–1, pp. 498–509.
Healey, P., Proc. 7th European Conf. on Optical Communication, Copenhagen 1981, pp 5.2.1–4.
Bernard, J.J. et al., Symposium on Optical Fiber Measurements, Boulder, Colorado NBS Publication 683m, pp 95–98.
Bernard, J.J. & Depresles, E., Proc. S.P.I.E., 1987, vol. 838, pp 206–209.
Everard, J.K.A., Electronics Letters 1989, vol. 25, pp 140–142.
Nazarathy, M. et al. J. Lightware Technology 1989, vol. LT–7, pp 24–38.
Venkatesh, S. & Dolfi, D.W., Applied Optics, 1990, vol. 29, pp 1323–1326.

(List continued on next page.)

Primary Examiner—Frank G. Font
Assistant Examiner—Michael P. Mooney
(74) Attorney, Agent, or Firm—Welsh & Katz, Ltd.

(57) ABSTRACT

In an optical time domain reflectometry method, in which a plurality of pulses of optical radiation, delayed by known amounts of time relative to one another such that adjacent pulses do not overlap, are launched into an optical fiber (6) of interest and optical radiation backscattered from the fiber (6) is detected to produce electrical output signals the said plurality of pulses have different respective wavelengths and are derived from optical radiation at a preselected wavelength, each of the said pulses having a peak power less than the power at which non-linear effects begin to occur in the said optical fiber (6). The said backscattered optical radiation is processed before detection so as to remove the effect thereon of the relative time delays between the said plurality of pulses.

50 Claims, 9 Drawing Sheets

OTHER PUBLICATIONS

MacDonald, R.I., Applied Optics 1981, vol. 20, pp 1840–1844.

Healey, P. et al, Electronics Letters 1982, vol. 18, pp 862–863.

Healey, P., Electronics Letters 1984, vol. 20, pp 360–362.

M.P. Gold: "Design of long–range single–mode OTDR", J. Lightwave Technology, LT–3, pp 39–46, 1985.

P.C. Wait & T.P. Newson: "Landau—Placzek ratio applied to distributed fibre sensing", Optics Communications, vol. 12, pp 141–146, 1996.

P. Healey, "Fading in Heterodyne OTDR", Electronics Letters, vol. 20, pp 30–32, 1984.

Chapters 10 and 11 of "Optical Fiber Sensor Technology", edited by K.T.V. Grattan and B.T. Meggitt, Chapman & Hall 1995.

Chow, Town et al, "Multiwavelength generation in an erbium–doped fiber laser using in–fiber comb filters", IEEE Photonics Technology letters, vol. 8, No. 1, Jan. 1996.

Yamashita & Hotate, "Multiwavelength erbium–doped fiber laser using intracavity etalon and cooled by liquid nitrogen", Electronics Letters, Jul. 4 1996, vol. 32, No. 14.

Sumida "Optical Time Domain Reflectometry Using an M–ary FSK Probe and Coherent Detection", Journal of Lightwave Technology, vol. 14, No. 11, Nov., 1996.

Cowle et al., "Brillouin/Erbium fiber Lasers", Journal of Lightwave Technology, vol. 15, No. 7, Jul. 1997.

"Chirp optical time–domain reflectometry" by Sato et al, OFC'95 Technical Digest, vol. 8, pp 240–241. The OFC '95 document discloses the features in the pre–characterizing portions of claims 1 and 7. That document proposes the use of two separate sources of differing wavelengths for the two pulses to be launched into the fibre; there is no suggestion whatsoever in this document that it might be advantageous to derive a plurality of pulses from a single pulse nor would it have been obvious for anyone to have thought to implement such an arrangement as specified in the present claims.

Graydon, O., et al., Triple Frequency Operation of an Er–Doped Twincore Fiber Lop Laser, IEEE Photonics Technology Letters, vol. 8, No. 1, Jan. 1996.

* cited by examiner

OPTICAL TIME DOMAIN REFLECTOMETRY METHOD AND APPARATUS

The present invention relates to an optical time domain reflectometry (OTDR) method and apparatus.

Optical time domain reflectometry (see Barnoski, M. K. and Jensen, S. M., Applied Optics 1976, vol. 15, pp 2112–15) involves launching a short pulse of light into an optical fibre and observing the backscatter return from the entire length of the fibre. The backscatter consists of light scattered through a variety of mechanisms, including Rayleigh, Brillouin and Raman scattering. The scattered light is quasi-isotropic and that fraction of the light which falls within the cone of acceptance of the fibre in the reverse direction is guided back towards the source. The light signal thus obtained typically takes the shape of a decaying waveform, the rate of decay being indicative of the local attenuation of the fibre. However, in addition to changes in rate of decay, localised changes in signal level can be caused by localised variations of the scattering coefficient, of the numerical aperture (for multimode fibres), or of the spot size (for single mode fibres). The distance along the fibre can be related to time of arrival of the signal by means of the known velocity of light (in a manner similar to that used in other reflectometric techniques, such as Radar or Sonar).

In the case of telecommunications applications, where OTDR is most widely used, the interest is in determining the attenuation of the fibre as a function of distance and any changes in the loss with time or position (e.g. point discontinuities).

Some of the localised effects could be caused by the action of external measurands and this fact has been exploited in a variety of designs of distributed sensor (see Hartog, A. H., J. Lightwave Technology, 1983, vol. LT-1, pp 498–509). In those designs which have been developed commercially, a small part of the scattered light spectrum, consisting of Raman or Brillouin scattered light, is selected. These spectral lines are typically very weak compared with the dominant Rayleigh scattering, and a major problem in the design of such sensors is achieving a sufficient signal-to-noise ratio to obtain a measurement of adequate resolution in an acceptable measurement time.

In the cases of both OTDR and of distributed sensing using OTDR, one major limitation is that of the power which can be launched into the fibre. The performance of optical time domain reflectometers (OTDRs) and OTDR-based sensors is measured by the maximum length of fibre which can be measured to a given signal uncertainty in a given measurement time with a given spatial resolution. The length of fibre is itself determined by the ratio of the dynamic range of the instrument to the loss per unit length of the fibre measured. Since the losses vary between fibres, a more common description of the range of an OTDR is the dynamic range, i.e. the maximum one-way signal attenuation at which the backscatter signal(s) can be measured to the required resolution.

The dynamic range is determined principally by the energy of the probe pulse launched into the fibre, the sensitivity of the receiver and, although these cannot always be controlled by the instrument designer, by the characteristics of the fibre and the efficiency of the optical arrangement within the instrument. Thus the range of an OTDR or OTDR-based sensor is maximised by making the receiver as sensitive as possible and launching as much energy as possible into the fibre. The energy of the pulse may be increased by increasing either its peak power or its duration. In the latter case, the spatial resolution of the instrument (i.e. its ability to distinguish separate, but closely adjacent, features along the fibre) is degraded. The central problem is thus one of increasing the energy launched into the fibre without degrading the spatial resolution.

Whereas the technology of semiconductor lasers until recently limited the power available within optical fibres, especially single-mode fibres, to approximately 100 mW, the development in recent years of optical amplifiers, especially those based on rare-earth-doped fibres, has lifted this limitation for all practical purposes, at least in pulsed applications. The power which may be launched into an optical fibre is therefore limited by non-linear effects, which result from the interaction of high-intensity light with the glass forming the structure of the fibre. Optical non-linear effects occur at modest power levels in optical fibres because the guiding structure confines the optical power to a small area over very long distances, resulting in far greater interaction lengths than could be achieved with Gaussian beams in a non-guiding medium. These non-linear effects have been reported in a number of publications and are summarised below, but a more detailed review may be found (for example) in Chapter 10 of the book by K. T. V. Grattan & B. T. Meggitt (Eds.): "Optical Fiber Sensor Technology" Chapman & Hall 1995 (ISBN-0-412-59210-X).

a) Stimulated Raman Scattering (SRS):

The stimulated Raman effect results from the interaction of the incident radiation with molecular vibrations (optical phonons) and gives rise to the conversion of optical power from the incident wavelength to (in the first instance) a longer wavelength, known as the Stokes wavelength. The Stokes wavelength is separated from the incident wavelength by a frequency shift, which depends on the materials forming the fibre, but for silica-based fibres is mainly around 440 cm$^{-1}$. Thus for incident light at 1550 nm, the first Stokes radiation appears at a wavelength of about 1663 nm.

For a probe wavelength of 1550 nm launched into a long length (of order 5 km or more) of single mode fibre of the type commonly used for telecommunications purposes, the stimulated Raman effects converts significant amounts of probe power to the first Stokes wavelength when the peak power exceeds typically 1 to 3 W, depending on the design of the fibre. If the optical power at the Stokes wavelength builds up to a sufficient level, it can itself generate light at a second Stokes wavelength and so on. Under suitable conditions, SRS can also occur at a shorter wavelength (anti-Stokes Stimulated Raman scattering), but the predominant effect is a shift to longer wavelength, which can be so efficient that most of the power of the incident light is converted to longer wavelengths.

Stimulated Raman scattering is primarily a forward-effect (i.e. the converted light travels in the same direction as the incident light) and is determined by the peak optical power. It is relatively independent of the duration of the pulse. It is also independent of the spectral width of the incident light, provided the latter falls within the broad gain spectrum of the Raman process (in the case of an incident wavelength of 1550 nm, the incident spectrum would scarcely affect the efficiency of the SRS process until it reached some 35 nm full-width at half maximum).

b) Stimulated Brillouin Scattering (SBS):

Stimulated Brillouin Scattering is caused by the interaction of the incident light with lattice vibrations (acoustic phonons), particularly those which have an acoustic wavelength similar to the incident optical wavelength. Like SRS, it results in the generation of a new wavelength, shifted with respect to the incident wavelength by a frequency equal to that of the acoustic phonons taking part in the interaction. This frequency depends on the material and the incident wavelength, but in silica-based fibres and for an incident wavelength of 1550 nm it is typically 10.7 GHz.

Unlike SRS, SBS is a very narrow-linewidth process. Thus if the incident illumination has a broader spectrum than that of the process (typically 100 MHz in silica-based fibres), then the threshold for efficient conversion is raised in proportion to the ratio of the linewidth of the source to that of the SBS process. A further difference between SRS and SBS is that the latter is primarily a backward process, i.e. the new wavelength travels in the reverse direction from that of the incident radiation. As a result, the overlap between the incident light and the Brillouin emission occurs only over a length of the fibre corresponding to the pulse width. The threshold for stimulated Brillouin scattering is therefore proportional to the product of pulse power and pulse duration, i.e. to the energy in the pulse. For continuous-wave input power launched into low-loss fibres, the SBS effect can occur at extremely low optical power, of order 1 mW.

c) Other Mechanisms:

There exist other effects which, under certain circumstances, can limit the allowable power launched in the fibre, such as four-wave mixing and self-phase modulation. However, they are of relevance primarily to OTDRs where coherent detection methods are employed.

At a wavelength in the region of the lowest loss transmission for silica-based fibres, 1550 nm, the limitation caused by Raman scattering on allowable transmitted power is around 1 W, depending on the loss of the fibre and its design. As noted earlier, the power limitation for stimulated Brillouin scattering depends on the pulse duration and for 1 m spatial resolution (i.e. 10 ns pulse duration) it is similar to that for Raman scattering, for an incident linewidth significantly below that of the scattering process. For longer pulses, the maximum allowable power decreases in proportion to the pulse duration.

Since it is desirable to increase the dynamic range of both OTDRs and OTDR based sensors, a number of methods have been employed and described in the literature. Some of the methods employed are described below, but a more detailed review may be found (for example) in the book by K. T. V. Grattan & B. T. Meggitt (Eds.): "Optical Fiber Sensor Technology" Chapman & Hall 1995 ISBN 0 412 59210 X (where Chapter 11 is primarily of relevance to the present application and is hereby incorporated by reference).

In order to increase the energy launched into the fibre without degrading the spatial resolution, methods based on pulse compression coding [Healey, P., Proc. 7th European Conf. on Optical Communication, Copenhagen 1981, pp 5.2.1–4; Bernard, J. J. et al, Symposium on Optical Fiber Measurements, Boulder, Colo. NBS Publication 683 m pp95–8; Bernard, J. J. and Depresles, E. Proc. S.P.I.E., 1987, vol. 838, pp206–9; Everard, J. K. A., Electronics Letters 1989, vol. 25, pp 140–2] and variants thereof have been employed.

In essence, a train of pulses, either continuous or of finite code length, is launched into the fibre. This gives rises to a number of separate backscatter waveforms which overlap in time when returning to the OTDR instrument. These overlapping waveforms are detected and the electrical output thus obtained is fed to a correlator circuit, together with the original code. The output of the correlator is a signal having a spatial resolution similar to that of a single pulse in the input pulse train, but an intensity increased by the number of "1" pulses in the pulse train. In this way, the signal-to-noise ratio is increased by a factor given by half the square root of the number of "1" pulses in the input code. This improves the resolution of the backscatter measurement without, in principle, degrading the spatial resolution.

The limitations of these methods are firstly that there normally remain "sidelobes" in the correlation function, i.e. that, even under ideal conditions, features occurring in one part of the fibre re-appear in other parts, albeit with much lower intensity. Secondly, where the code is continuous (as is the case when an m-sequence is used), the signal-dependent noise arising from the strong near-end backscatter dominates the very weak signals generated at the remote end of the fibre. Since, for a continuous code, the near-end noise arrives at the receiver simultaneously with the far-end signal, this cannot be eliminated by its time of arrival as is the case in single-pulse reflectometry.

Unfortunately, the use of finite-duration codes does not solve the problem just discussed, since such finite-length codes have worse side-lobe characteristics than continuous codes.

Complementary code methods, in which several different codes are launched into the fibre, such that the sum of their correlation functions is the ideal single-pulse response function, have been proposed and commercial equipment based on these principles have been manufactured [Nazarathy, M. et al. J. Lightwave Technology, 1989, vol. LT-7, pp24–38]. However, a further, practical, problem remains with these methods, namely that, for the correlation processing to be effective, it is necessary for the-optical pulse train to be extremely accurate, i.e. that the energy in each of the laser pulses must be uniform and their position exactly as required by the definition of the pulse sequence. In practice, these conditions are difficult to meet and failure to generate the required optical waveform accurately results in additional sidelobes in the correlation function. A further requirement in such systems is that all of the detection and signal acquisition electronics should exhibit a very high degree of linearity.

Related methods, such as frequency-modulated continuous wave modulation [Venkatesh, S. and Dolfi, D. W. Applied Optics, 1990, vol. 29, pp1323–6], or step-frequency modulation [MacDonald, R. I., Applied Optics 1981, vol. 20, pp1840–4] derived from Radar technology have also been proposed. So far few of the latter methods for increasing the pulse energy have been successful commercially, owing to the difficulties mentioned.

Alternative approaches for extending the range of OTDRs and OTDR-based sensors have involved optimising receiver and optical design, and a detailed review of these may be found in the book by K. T. V. Grattan & B. T. Meggitt (Eds.): "Optical Fiber Sensor Technology" Chapman & Hall 1995 ISBN 0 412 59210 X (see particularly Chapter 11).

One such approach involves the use of coherent optical receivers [Healey, P. et al., Electronics Letters 1982, vol. 18, pp862–3], where the detector is illuminated, in addition to the backscattered light, with the output of a local oscillator which emits at the same frequency as the backscattered light (in the case of homodyne detection) or is frequency-shifted relative to the backscatter (in the case of heterodyne detection). In either case, the detector responds to the product of the electric fields of the local oscillator and of the backscattered light. Since the local oscillator power can be made arbitrarily large, it is possible to ensure that this product dominates the noise of the receiver. In principle, detection sensitivities approaching the quantum limit can be obtained. Coherent detection OTDR requires sources of very narrow linewidth, which has resulted in the method receiving relatively little practical application in the 15 years since it was initially proposed. However, the sources and other components required for assembling a coherent OTDR have advanced in the intervening years and further results have been published recently.

Several practical difficulties, however, affect this method. The first is that the interference effect, which takes place at the detector and which provides the frequency down-conversion inherent in coherent detection, is polarisation-sensitive. Although the state of polarisation of the local oscillator may be controlled, that of the backscatter is affected by the birefringence of the sensing (or measurement) fibre, which in turn is dependent on the external environment of the fibre. Therefore it is necessary to use a polarisation-diversity receiver (i.e. a dual receiver which is simultaneously and separately sensitive to two orthogonal states of polarisation of the backscatter); alternatively, the polarisation of the local oscillator must be varied continuously over an adequately wide sample of all possible polarisation states during each measurement to "scramble" the relative polarisations of signal and local oscillator. A second problem [Healey, P. Electronics Letters 1984, vol. 20, pp30–2 and Healey et al, ibid., 1984, vol. 20, pp360–2] is that of "coherence" fading, where the backscatter signal, when generated by a very narrow-band source, is found to interfere with itself. The result is a stable envelope for the backscatter signal, under which the signal can vary, at usually a very slow rate, from 0% to 100% of the envelope. Clearly, this fading introduces significant errors in the acquisition of the backscatter signal and the only solution found to date has been to vary the input optical frequency over as wide a range as possible during the measurement.

A further enhancement to the coherent detection method has recently been proposed and demonstrated by M. J. Sumida, in Lightwave Technology, 1996, vol. 11, pp 2483–91. An OTDR employing this method is known as a M-ary coherent OTDR. In this arrangement of a heterodyne OTDR, a sequence of M pulses, each shifted in frequency with respect to one another and with respect to the laser source from which they are derived, is launched into the fibre under test. The backscatter return from this sequence of pulses is combined with the unshifted, continuous, laser output (which serves as a local oscillator) onto a single optical receiver.

The receiver output consists of M signals at each of the difference frequencies between on the one hand the local oscillator and on the other hand each of the probe pulses. In the apparatus, these frequencies are separated by means of a series of M bandpass filters. Each of the M frequencies is then down-converted by a frequency-translation circuit and then processed through a separate envelope detection circuit. The resulting rectified signals are then time-shifted relative to one another, to cancel the relative delays between the times at which each of the M pulses were launched into the fibre; each of these signals represents a separate measurement of the backscatter in the fibre. The time-aligned signals are then added together, which is equivalent to summing the outcome of separate measurements using individual pulses (in practice, it is easier first to digitise the signals emerging from the envelope detection circuits using separate analog-to-digital conversion circuits and to carry out the subsequent manipulation in digital circuitry).

This method has several claimed benefits, namely that it improves the measurement time required to achieve a predetermined signal-to-noise by a factor of M. Secondly, because the fading effects are extremely dependent on the exact frequency of the probe pulse, the quasi-simultaneous measurement by M pulses has the effect of substantially reducing the fading.

However, the M-ary coherent detection approach is appropriate only to Rayleigh backscattering systems, which would exclude many distributed sensor designs. A further drawback of the M-ary coherent detection method is that it requires an M-fold replication of a considerable number of electronic circuits. Moreover, for a reasonably high-resolution OTDR or OTDR-based sensor and a large number of pulses concurrently launched into the fibre, the frequency range to be covered by the receiver, bandpass filters and frequency translation circuits is substantial. In the example given by the author for an extension to 100 pulses, the frequency range would have been up to 8 GHz. Thus whilst the M-ary coherent detection method may find applications in long-distance telecommunications where the spatial resolution required is modest, it is expensive and complicated for sensor applications and not so well suited to high resolution OTDR applications.

Accordingly, it is desirable to provide a more practicable method for overcoming the peak power limitations of optical fibres, applicable to a wide range of OTDRs and OTDR-based sensors.

In particular, it is desirable to increase the probe energy launched into the fibre, whilst avoiding detrimental effects, such as optical non-linearity or loss of spatial resolution. According According to a first aspect of the present invention there is provided an optical time domain reflectometry method in which a plurality of pulses of optical radiation, having different respective wavelengths and delayed by known amounts of time relative to one another such that adjacent pulses do not overlap, are launched into an optical fibre of interest and optical radiation backscattered from the fibre is detected to produce electrical output signals, the said backscattered optical radiation being processed before detection so as to remove the effect thereon of the relative time delays between the said plurality of pulses; characterised in that the said plurality of pulses is derived from a pulse of optical radiation in a preselected wavelength band, each of the said pulses having a peak power less than the power at which non-linear effects begin to occur in the said optical fibre.

The said pulse of optical radiation in a preselected wavelength band may be emitted by a broadband source containing a plurality of different wavelengths.

There are n pulses in the said plurality, where n is an integer greater than or equal to 2.

A method embodying the first aspect of the present invention may be used in characterising the said optical fibre of interest.

Alternatively, a method embodying the first aspect of the present invention may be used for sensing respective values of a physical parameter at different locations along the said optical fibre of interest.

In one example of the method applied to sensing, the part of the said backscattered optical radiation which is used to produce the said output signals comprises that in respective spectral bands resulting from spontaneous Brillouin scattering in the optical fibre of the said plurality of pulses of optical radiation.

According to a second aspect of the present invention there is provided optical time domain reflectometry apparatus comprising means operable to launch a plurality of pulses of optical radiation, delayed by known amounts of time relative to one another such that adjacent pulses do not overlap, into an optical fibre of interest and detection means operable to produce electrical output signals in response to optical radiation backscattered from the fibre; characterised by: source means for emitting a pulse of optical radiation in a preselected wavelength band; pulse spreading means, connected to receive the said optical radiation emitted from the said source means and operable to derive therefrom the said plurality of pulses such that the pulses of the said plurality have different respective wavelengths and a peak power less than the power at which non-linear effects begin to occur in the said optical fibre, the said pulse spreading means being connected to launch the said plurality of pulses into the said optical fibre; and pulse re-forming means connected, between the said optical fibre and the said detection means, to intercept backscattered optical radiation from the said optical fibre, the said pulse re-forming means being operable to process said backscattered optical radiation so as to remove the effect on that backscattered optical radiation of the relative time delays between the said plurality of pulses and to output the processed backscattered optical radiation to the said detection means.

The said source means may be a broadband source containing a plurality of different wavelengths.

There are n pulses in the said plurality, where n is an integer greater than or equal to 2.

In some cases, the said pulse spreading means desirably also constitute the said pulse re-forming means.

The said pulse-spreading means and/or the said pulse re-forming means desirably comprise a serial reflective network.

The said serial reflective network may comprise a plurality (n) of serially-connected wavelength-selective reflectors.

The said reflectors advantageously comprise gratings.

At least some of the reflectors are preferably connected by amplifying fibre sections.

Desirably, when the pulse-spreading means are distinct from the said pulse re-forming means, the said reflectors of the pulse-spreading means have different spectral widths to the reflectors of the pulse re-forming means.

In this case, the spectral widths of the reflectors of the said pulse spreading means are narrower than those of the reflectors of the pulse re-forming means.

At least some of the said reflectors of the pulse-spreading means may be selected so as to have differing respective spectral widths such that all of the pulses derived by the pulse-spreading means are of approximately equal amplitude.

The said pulse-spreading means and/or the said pulse re-forming means may alternatively comprise a parallel transmissive or reflective network.

The said parallel transmissive network preferably comprises a wavelength division demultiplexer, a wavelength division multiplexer and a plurality (n) of fibre delay lines connected between the said wavelength division demultiplexer and the said wavelength division multiplexer.

The said parallel reflective network may comprise a wavelength division demultiplexer and a plurality (n) of fibre delay lines connected between the said wavelength division demultiplexer and reflective means.

Apparatus embodying the second aspect of the present invention is designed so as to substantially avoid the occurrence of non-linear effects in the pulse-spreading means.

This is preferably achieved by restricting the peak power of optical radiation entering the said pulse spreading means to a level below that at which non-linear effects occur, in which case the apparatus further comprises amplifying means for amplifying the pulses produced by the said pulse spreading means.

Apparatus embodying the second aspect of the present invention is advantageously used for sensing respective values of a physical parameter at different locations along the optical fibre, in which case the said optical fibre is deployed through a region of interest.

Preferably, the said detection means are operable to detect backscattered optical radiation in respective spectral bands resulting from spontaneous Brillouin scattering in the optical fibre of the said plurality of pulses of optical radiation.

The said source means desirably emit optical radiation in more than one spectral band, such that each spectral band is narrow and is separated from the or each of the others such that the spectral bands resulting from spontaneous Brillouin scattering in the fibre remain distinct from the Rayleigh spectral band and other spectral bands present in the source means.

The said source means are preferably formed by a laser cavity defined between a pair of mirrors and further comprising, in series between the said mirrors, a gain medium, a Q-switch device and a wavelength-selective element having at least two pass bands.

The source means desirably emit a spectrum in which the spectral bands are substantially periodic. The spectral bands may advantageously have a period which is approximately twice the Brillouin wavelength shift.

Preferably, the wavelength-selective element also serves to separate out the Brillouin backscatter signals and the Rayleigh backscatter signals.

Thus, in an embodiment of the present invention, enhanced performance may be obtained by selecting a pulsed source the output of which covers a relatively wide spectral range. The source spectrum is divided by an optical network into at least two spectral bands, which are delayed relative to one another and launched into the fibre. The resulting backscattered waveforms are processed by means of an optical network which cancels the relative delays between the constituent spectral bands. The optical signal thus obtained is then fed to an optical receiver which converts the signal into electrical form which is then processed in the usual way.

Reference will now be made, by way of example, to the accompanying drawings, in which.

In a method embodying the present invention multiple wavelengths are launched into the fibre simultaneously in such a way that their backscatter signals overlap, but can be separated at the launch end from the knowledge of the detailed content of the launch spectrum and of the time/wavelength characteristics of the launched probe pulses. Implementations of the proposed method are illustrated in FIGS. 1a to 1e, and are particularly appropriate for an OTDR using Rayleigh scattering in, for example, applications in the monitoring of long-distance telecommunications optical cables.

Figure 1A:
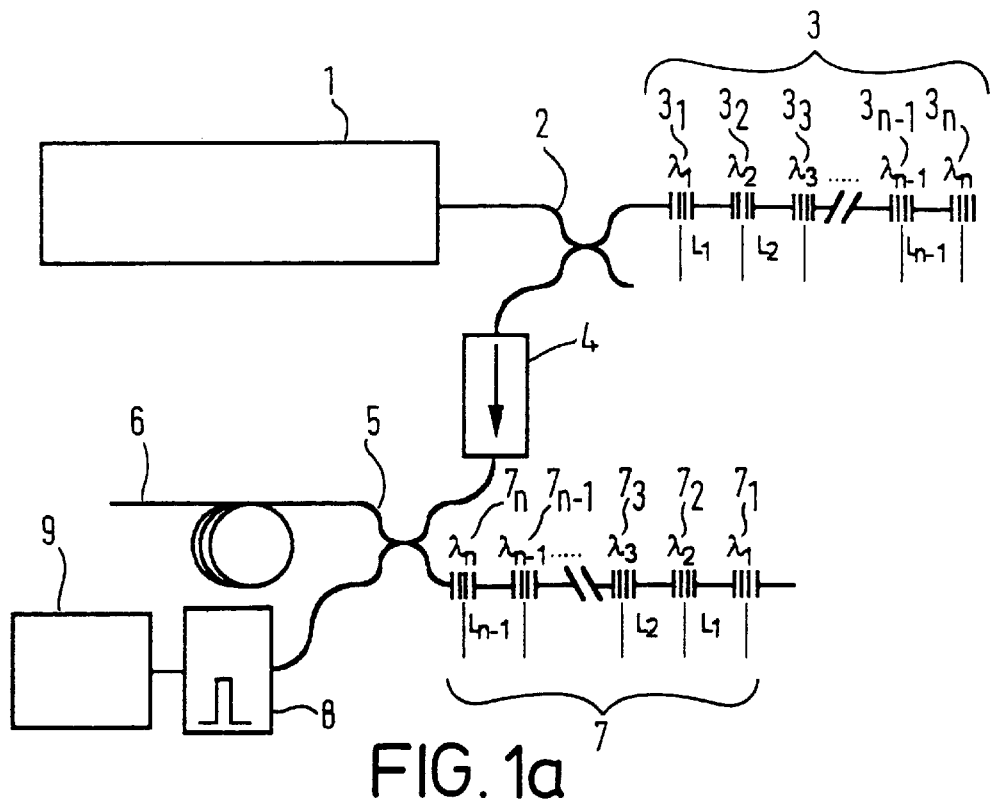
FIGS. 1a to 1e show respective schematic diagrams of apparatus embodying the present invention.

Referring to FIG. 1a, the output of a pulsed, high-power, broad-spectrum (or broadband) light source 1 is directed, through a directional coupler 2, at an optical pulse-spreading network 3, consisting of a series of n wavelength-selective reflectors $3_1, 3_2 \ldots 3_{n-1}, 3_n$. The network 3 outputs specific spectral lines $\lambda_1, \lambda_2, \lambda_3, \ldots, \lambda_{n-1}, \lambda_n$ at times separated by a pre-defined amount. The output of the network 3 is thus a sequence of optical pulses separated in time by a sufficient delay to avoid overlap or non-linear interaction in the fibre which is being measured. This approach will be referred to hereafter as the "spread-wavelength technique".

Figure 2A:
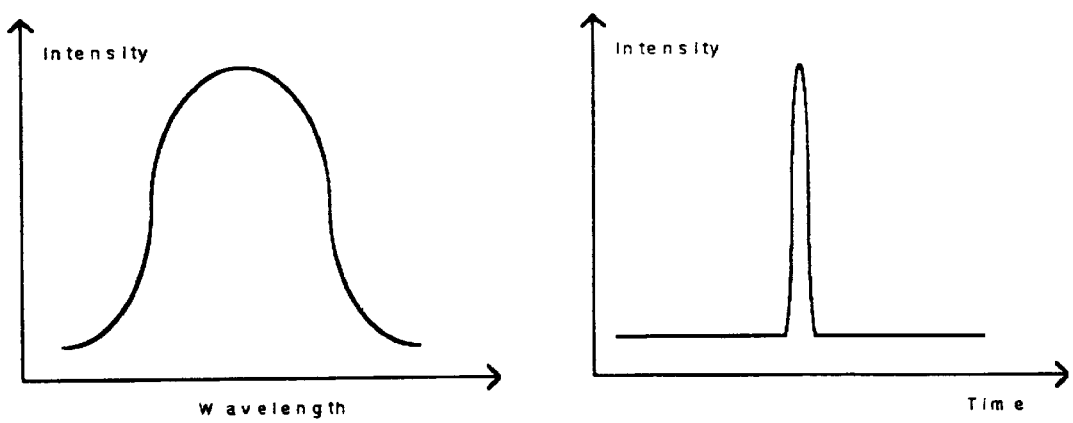
FIGS. 2a and 2b show graphs illustrating characteristics of the light travelling through the apparatus of FIGS. 1a to 1e.
Figure 2B:
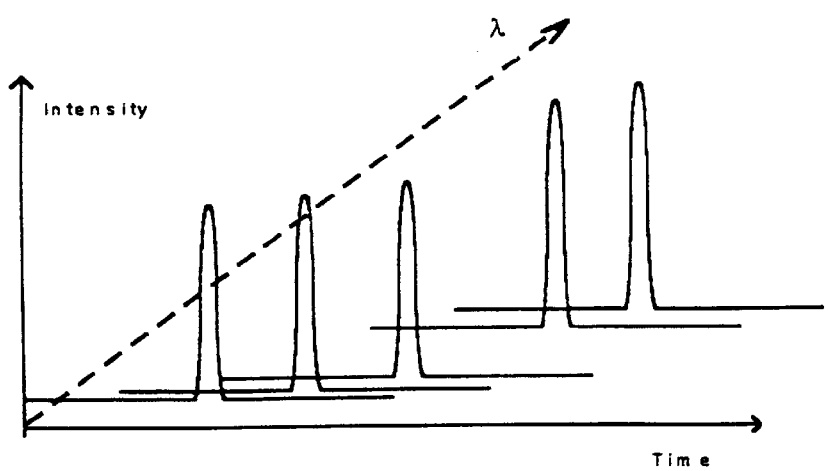
Figure 2B:
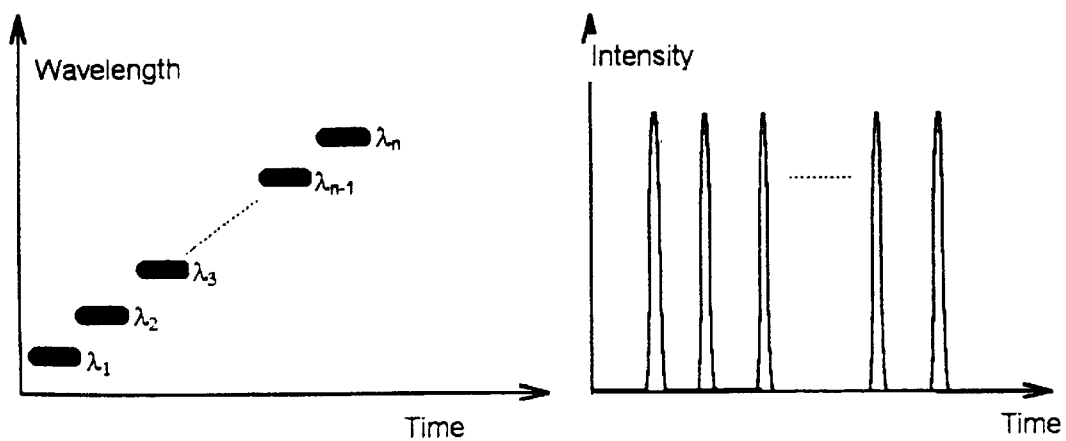

A fraction of the light returning from the pulse-spreading network 3 is directed, via the directional coupler 2, an isolator 4 and a second directional coupler 5, to a fibre 6 to be measured (the "test fibre"). Thus the test fibre 6 is probed by several pulses of different wavelengths $\lambda_1, \lambda_2, \lambda_3, \ldots, \lambda_{n-1}, \lambda_n$ quasi-simultaneously. Each of these pulses creates its own backscatter signal, which signals overlap in time but are distinguishable through their differing wavelengths $\lambda_1, \lambda_2, \lambda_3, \ldots, \lambda_{n-1}, \lambda_n$. None of these pulses is, in itself, of sufficient peak power to cause non-linear effects to occur. The time-wavelength relation is illustrated in FIGS. 2a and 2b. The graphs of FIG. 2a show the initial characteristics of the source 1. The graphs of FIG. 2b show the characteristics of the light output by the pulse spreading network 3.

The backscatter signals, on returning to the launching end of the measured fibre 6, are presented, after passing again through the second directional coupler 5, to another optical network 7, consisting of n wavelength-selective reflectors $7_n, 7_{n-1}, \ldots 7_3, 7_2, 7_1$, which performs the reverse function of delaying light at each wavelength by an amount sufficient to cancel the delays in the first network 3. In this way, the backscatter returns from all probe pulses overlap in time and may be directed (via the second directional coupler 5 and a gate 8) to a single optical receiver 9, where the signals are converted to electrical current and amplified prior to being digitised and processed in the usual way (these further processing methods are well-known in the field of optical time-domain reflectometry and details have been omitted for brevity). In order to avoid the backscattered light being reflected off the pulse spreading network (i.e. returning to the first directional coupler 2), it is desirable to provide some means of blocking the path from the second directional coupler 5 to the first 2. In FIG. 1a, this function has been accomplished by means of an optical isolator 4, a component which is readily available commercially and which, using Faraday rotators and polarising elements, allows optical power to propagate in one direction only.

Figure 1B:
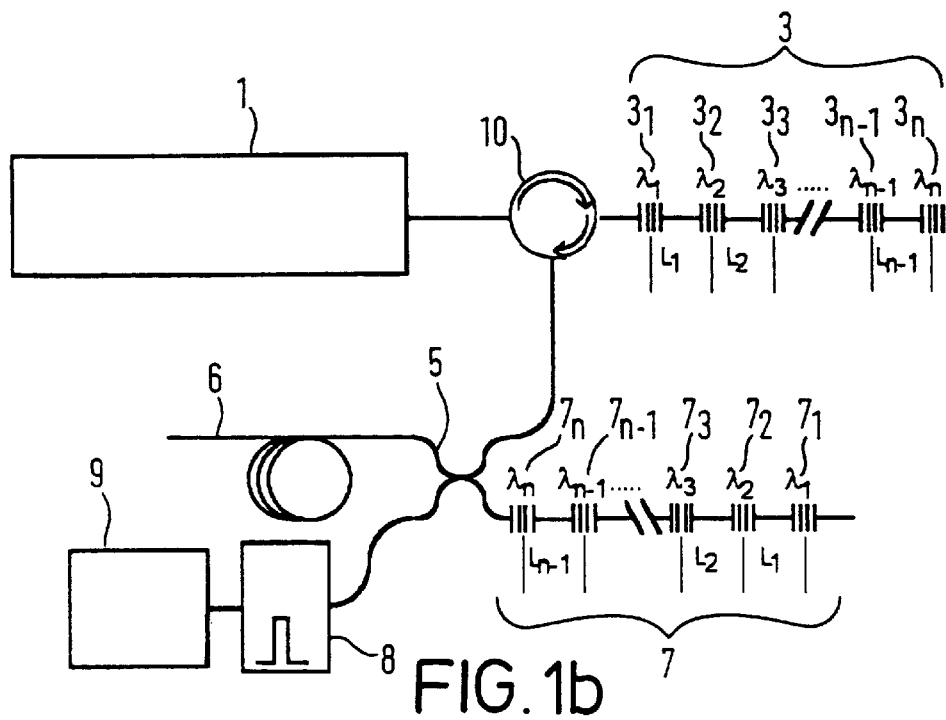

Naturally, the directional couplers 2, 5 shown in FIG. 1a, and in other embodiments, could be replaced by alternative optical components achieving a similar function, such as bulk-optic beam-splitters. The combination of optical fibre couplers at an isolator 4 in FIG. 1a is relatively wasteful of optical energy and therefore it is desirable to replace this combination with a more efficient device. In FIG. 1b, a so-called (three-port) optical circulator 10 has been substituted for the first coupler 2 and the isolator 4 of FIG. 1a. The circulator 10 (again a commercially available device) allows light to enter from a first port and exit from a second port but not in the reverse direction. Likewise, light entering from the second port is directed to a third port, but that entering the third port is blocked from reaching the second. Since the insertion loss of a typical circulator 10 is substantially less than the losses incurred with the directional coupler 2 and isolator 4, there is a benefit in the overall losses encountered by the optical signals.

Figure 1C:
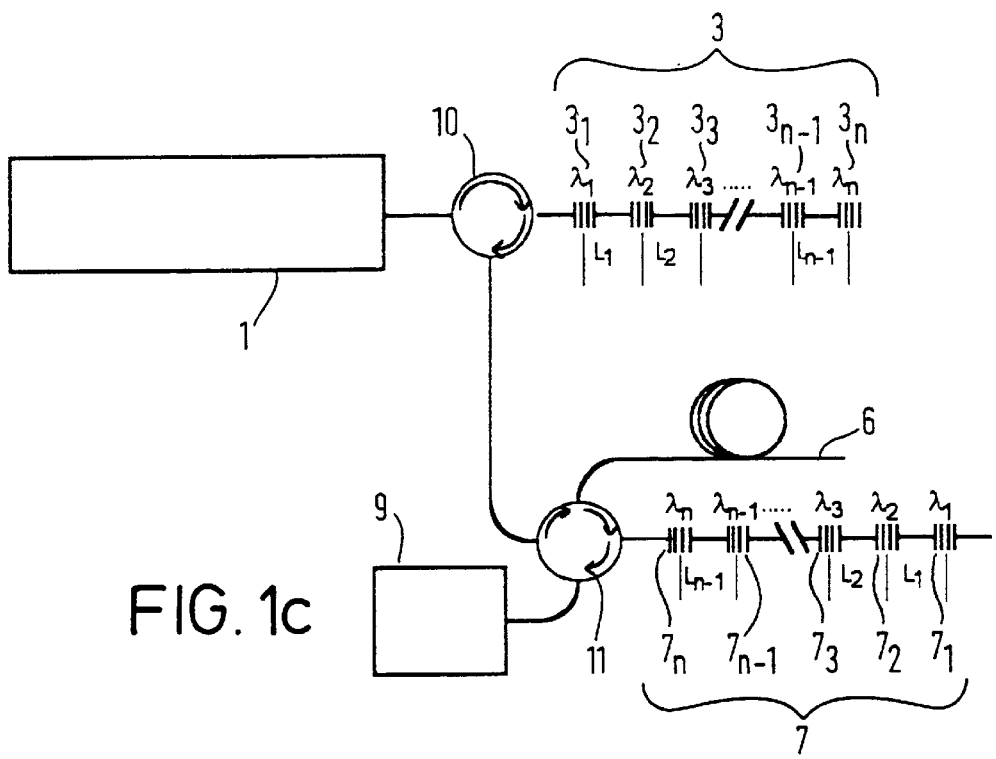

A further alternative is illustrated in FIG. 1c, where the second directional coupler 5 has also been replaced by a (four-port) circulator 11, with an anticipated improvement in optical efficiency, albeit at higher system cost.

In yet further alternative implementations (not shown), the passive directional coupling or circulator elements may be replaced by active elements which switch the optical path under electrical control. One example of such an active element is an acousto-optic deflector, which is well known in the OTDR literature (see for example M. P. Gold: "Design of a long-range single-mode OTDR" Journal of Lightwave Technology vol. LT-3, pp39–46, 1985).

Figure 1D:
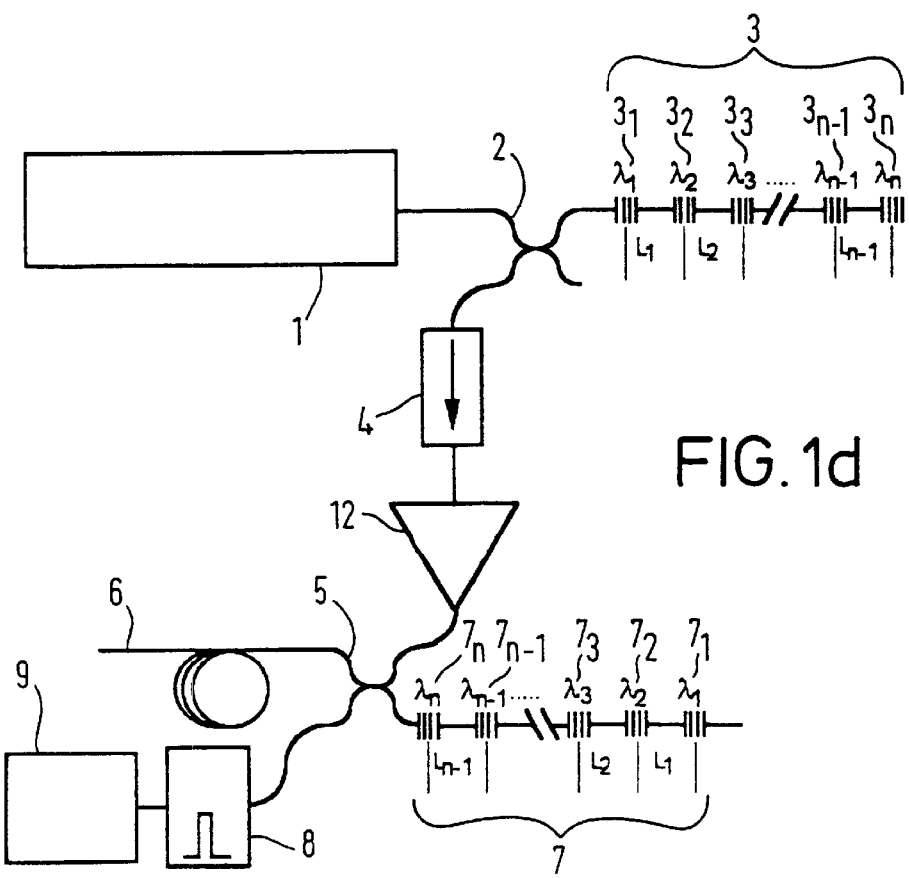

In cases where the number of reflectors employed is high, the peak power emerging from the laser 1 is likely to be substantially above the threshold for non-linear effects. Thus there is a possibility that non-linear interactions might occur within the pulse-spreading network 3 itself before the separation of the spectral components has taken effect. This is particularly likely to be the case where the spatial resolution of the OTDR is low (for example 100 m or longer) and where therefore the pulse-spreading network 3 could occupy a long enough length of fibre to facilitate the appearance of non-linear effects within the network 3 itself. As a rough indication, the problem is likely to be apparent if the product of the length of the network 3 and the peak power launched into it exceeds 10000 m.W. Thus for an instrument with a spatial resolution of 10 m, the minimum separation between reflectors $3_1, 3_2, \ldots$ is 10 m and thus 30 reflectors $3_1, 3_2, \ldots$ could be accommodated with an input power of 30 W. Each reflected pulse would then have a peak power of order 1W, just below the threshold for stimulated Raman scattering in typical long (>15 km) single-mode fibres at an operating wavelength of 1550 nm. If this limitation is restrictive in the design of the instrument, then it is possible to use a probe pulse from the broadband source 1 below the desired peak power and, after reflection from the pulse-spreading network 3, to provide a further amplification stage, as illustrated in FIG. 1d, which has been adapted from the arrangement of FIG. 1a by the addition of an optical amplifier 12, such as an Erbium-doped fibre amplifier (EDFA). By restricting the power in the optical pulse initially, the non-linear effects are avoided; after the pulse energy has been spread over a long time, the total energy may be increased to far higher levels whilst still preventing the non-linear effects. Clearly, the same principle applies to the arrangements of FIGS. 1b and 1c, as well as to the arrangements illustrated in FIGS. 6a, 7 and others (to be described below).

Figure 3:
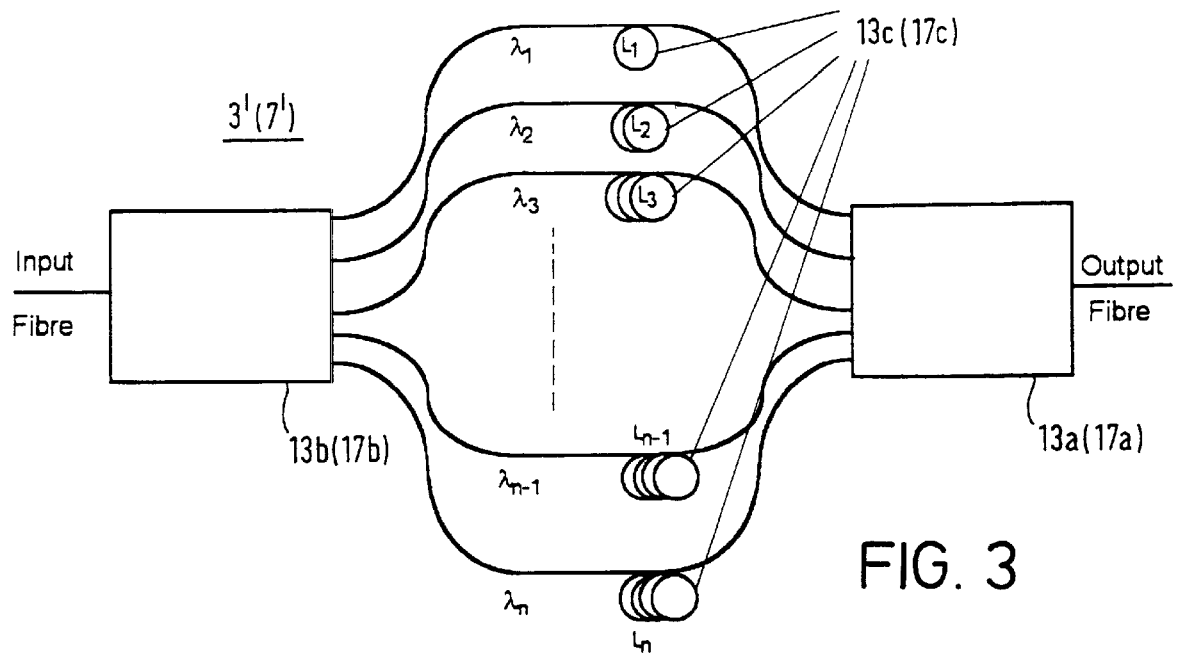
FIGS. 3 and 4 show respective schematic diagrams of part of the apparatus of FIGS. 1a to 1e.

In FIGS. 1a to 1e, the pulse-spreading and re-forming networks 3, 7 are shown as serial reflective networks, which is the simplest implementation, but other topologies are also possible. For example, a pair of wavelength division multiplexing/demultiplexing devices 13a, 13b (17a, 17b) could be used instead as pulse spreading and re-forming networks 3', 7', interconnected by varying lengths of fibre forming fibre delay lines 13c (17c), to provide a parallel transmissive topology, as illustrated in FIG. 3. The wavelength-division multiplexing/demultiplexing devices 13a, 13b (17a, 17b) separate and re-combine the various spectral components of the source pulse, and the fibre delay lines 13c (17c) adjust their individual timings. A wavelength division multiplexer 13a (17c) is a device which combines the inputs, at different wavelengths, from several fibres into a single common fibre. A similar device can be used in reverse as a wavelength division demultiplexer 13b (17c).

Figure 4:
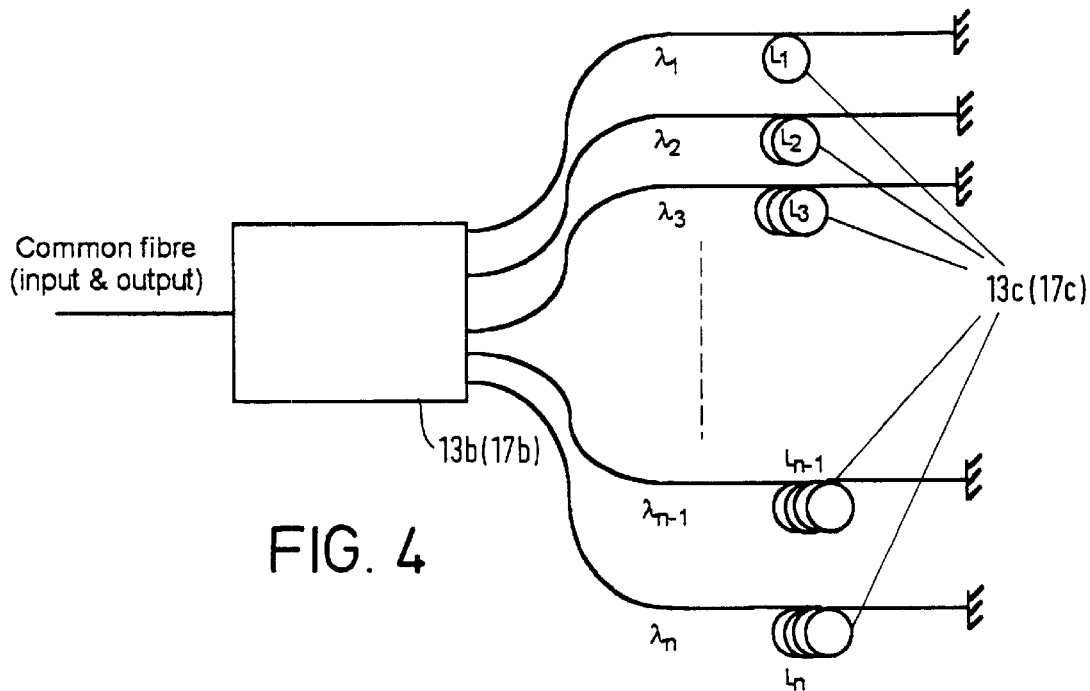

An alternative is a reflective, but parallel, arrangement, as shown in FIG. 4. As may be seen from the Figures, the parallel transmissive arrangement is more complex than either of the reflective arrangements. However, the parallel arrangements offer more flexibility, if required, in the relative timing of the different wavelengths, than the serial arrangement.

The serial reflective types of pulse-spreading and re-forming networks 3, 7 are preferably manufactured by forming fibre gratings within the fibre. The formation of such gratings is well known in the field of optical fibres using methods such as side-illumination by spatially periodic UV light, e.g. by means of an interference pattern or through a phase grating. Fibre grating devices are available commercially from a number of manufacturers, for example the 3M company of Minnesota, USA.

The separation between the pulses emerging from the network 3 is determined by the difference in propagation delay for the different wavelengths $\lambda_1, \lambda_2, \lambda_3, \ldots, \lambda_{n-1}, \lambda_n$. In the case of a reflective network, as illustrated in FIGS. 1a to 1e, the lengths L1, L2, . . . , Ln−1 between adjacent reflectors $3_1, 3_2, \ldots, 3_{n-1}, 3_n$ determine the time separation between pulses, each meter of fibre between the reflectors $3_1, 3_2, \ldots, 3_{n-1}, 3_n$ resulting in a delay of about 10 ns. If the pulse separation is greater than the duration of the original pulse, then interaction between the different pulses is reduced (eliminated to first order). Thus each pulse, occupying a separate portion of the wavelength spectrum, may be arranged to be below the threshold for non-linear effects, whilst the total energy launched could be many times greater than the non-linear limit for a pulse which has not been sent through the spreading network 3.

In principle, the sequence of gratings in the pulse-spreading or re-forming networks could be replaced by a single chirped grating, i.e. a grating device whose pitch varies continuously along the length of the device. In this case, instead of separating the light into a series of pulses of slightly different wavelength, the pulse is transformed into a far wider pulse whose wavelength varies continuously throughout its duration. However, such a chirped grating device, which would be required to be several 100 m in length, cannot be fabricated with presently available techniques and its handling would be extremely delicate (to avoid minute strains which would distort the grating characteristics).

Nevertheless, in this respect the attached claims are intended to encompass use of such a chirped grating, and accordingly the term "plurality of wavelengths" should be interpreted as covering both distinct spectral lines and a continuous spectrum.

As an example of the improvement which may be gained from the application of the present invention, the non-linear limit resulting from both Raman and Brillouin scattering is approximately 1 W for typical single-mode fibres operated at 1550 nm (in the case of Brillouin scattering, the cited power limit applies to a spatial resolution of order 1 m). Now if the spectral width of the source were, say, 15 nm and the spectrum were separated into intervals of 0.2 nm (which is easily feasible with current fibre grating technology), the source could be separated into 75 (15 nm/0.2 nm) pulses, each of which can be launched close to the non-linear limit. This implies an increase in launch energy by a factor of 75, with identical electronics and simple changes to the optical arrangement. This increase in launched energy will result in a proportional increase in signal, i.e. 18.7 dB (optical), which is sufficient to increase the range of the OTDR by 45 km for typical losses at 1550 nm, namely 0.2 dB/km. It will therefore be seen that the proposed technique will allow a substantial increase in the performance of OTDRs and OTDR based sensors.

The spectral distribution of broadband sources 1 is typically not uniform over their entire emission spectrum. In order to take full advantage of the increased launch energy made possible by the proposed technique, it may be necessary to include some form of spectral shaping, i.e. an optical filter, which attenuates preferentially the strongest wavelengths in the source spectrum, in order that the intensity distribution amongst the different pulses launched into the fibre might be more uniform. Such a filter is particularly advantageous where the source 1 contains, or is amplified by, an Erbium-doped fibre amplifier, the gain of which is far from uniform over its gain bandwidth. The basic concept of equalising the gain in optical amplifiers has been discussed in the prior art and may be achieved by adding extrinsic devices to the amplifier, such as a dielectric filter. Alternatively the design of the amplifier itself may be adjusted to shape the spectral distribution of the source 1 by optimising such parameters as the composition and length of the gain medium and the pump source wavelength.

Figure 1E:
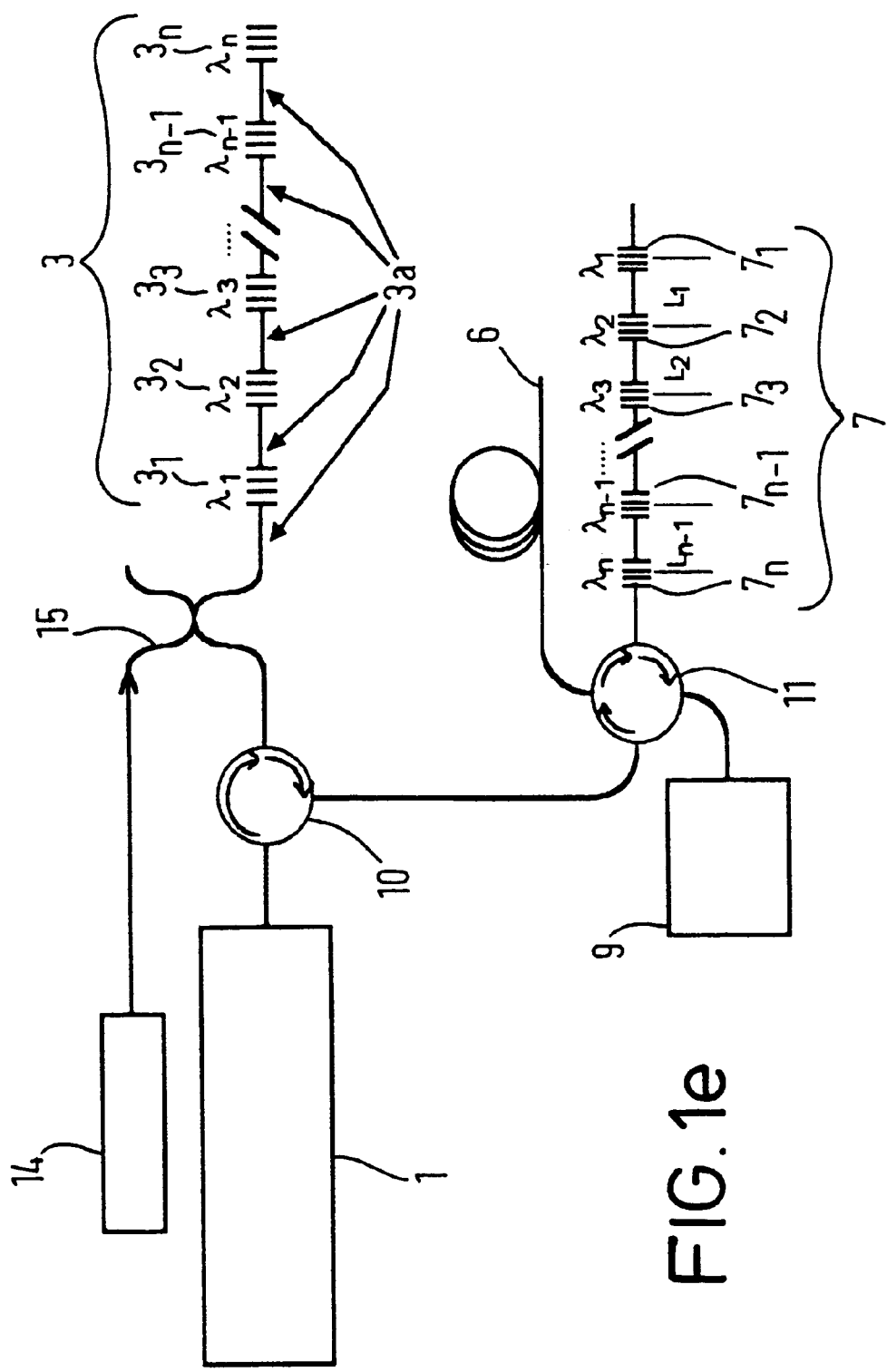

In the present application of optical fibre sources and amplifiers, a further option exists to flatten the power distribution amongst the wavelengths of interest, and simultaneously avoid launching power levels beyond the non-linear limits into the pulse spreading network 3. This option involves fabricating the pulse spreading network 3 using sections of amplifying (eg rare-earth-doped) fibre 3a, possibly interspersed with standard, not rare-earth doped, optical fibre. The entire pulse spreading network 3 is then illuminated by a pump source 14 as well as by the probe pulse 1. One possible such arrangement, adapted from that of FIG. 1c, is shown in FIG. 1e for illustration, although other combinations are possible. In FIG. 1e, the output of a pulsed broadband source 1 is launched through the first circulator 10 and through a wavelength-division multiplexing coupler 15. The latter is designed to transmit efficiently the output of both the pulsed source 1 and pump source 14 to the port to which the pulse spreading network 3 is attached. The pump power is absorbed by the rare-earth-doped fibre sections 3a incorporated in the network 3 which, as a result, exhibit gain at the wavelengths which the probe pulse occupies. Of course the probe pulse may not be uniform in its spectral intensity over the desired wavelength range. Likewise, the gain of the amplifying sections 3a may not be uniform. However, by selecting the order of the gratings along the pulse spreading network 3 and by adjusting the gain of the fibre sections 3a between the reflective gratings, the desired output spectrum and the desired output power can be generated.

Although there are many ways of synthesising the desired response function, the design process may be most easily understood by assuming that the gratings are arranged in decreasing order of their intensity on being emitted by the broadband source 1. The intensity of the most intense spectral component may be adjusted by selecting the gain of the fibre section 3a preceding the first grating. The gain of subsequent sections is then adjusted by consideration of the relative intensity of the spectral component reflected off each successive grating. Thus, in spectral regions where the adjacent wavelengths are of very similar intensity, undoped fibre may be used to separate the gratings. In contrast, where there is a large change in the intensity between adjacent spectral components, a fibre section 3a with significant gain would be selected.

A further means of balancing the intensity of the spectral components of the probe pulse is to arrange for the spectral width of the individual reflectors $3_1, 3_2, \ldots, 3_{n-1}, 3_n$ to vary approximately in inverse proportion to the power spectral density in the vicinity of their line centre. Thus at wavelengths where the intensity is high, the reflectors $3_1, 3_2, \ldots, 3_{n-1}, 3_n$ would be arranged to return only a narrow spectrum; in contrast where the power spectral density is relatively low, the reflection spectrum is arranged to be wider. In this way, each pulse emerging from the pulse spreading network 3 would be of similar amplitude.

The broadband source 1 must be chosen carefully. This device must have a broad (but not necessarily continuous) spectral output (where "broad" in this context should be interpreted as sufficient to ensure that the spectral output can be sub-divided into a further set of wavelengths, for example, greater than 2 nm, but preferably more than 20 nm), and a short pulse duration (determined by the desired spatial resolution, where for a spatial resolution of 1 m, a pulse width below 10 ns is required). To derive the full benefit of the improved method disclosed, it must have sufficient peak power that, after passage through (or, for reflective networks, after reflection by) the pulse-spreading network 3, the peak power in each of the resultant pulses is still near to the non-linear limit. One such source is a Q-switched fibre laser which by its nature delivers its output in short, high-intensity pulses; unless special measures are taken to narrow their linewidth, the output spectral width of Q-switched lasers is usually several nm, typically 5–10 nm.

It is conceivable that the source 1 may emit different wavelengths at different times, i.e. that it could combine the function of the source 1 and the pulse-spreading network 3.

Figure 5A:
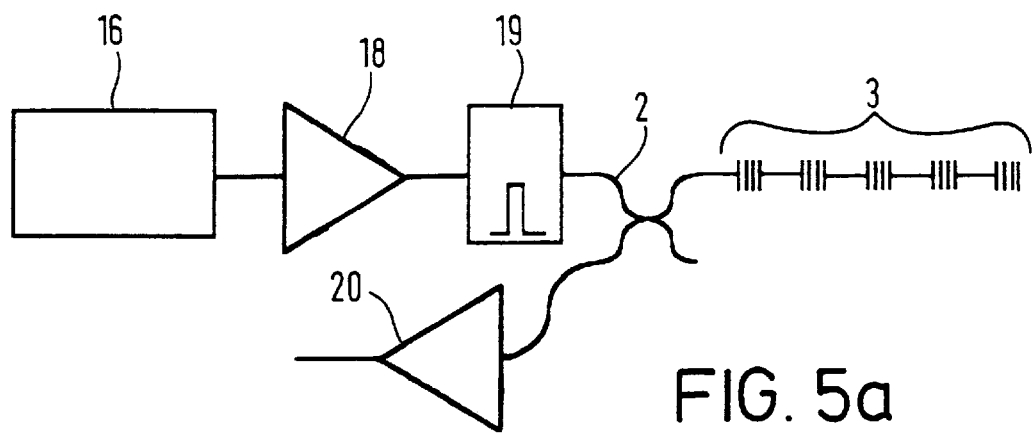
FIGS. 5a and 5b show respective schematic diagrams of part of apparatus embodying the present invention.

As an alternative, a broadband, low-intensity source can be used, such as an edge-emitting LED 16, as illustrated in FIG. 5a. This source 16 can be pulsed, by modulation of the bias current. The resulting low-power, broad-spectrum pulse can be amplified by means of a fibre amplifier (EDFA) 18 to produce the desired short-pulse, high-power, broad-spectrum output. Owing to the relatively high level of amplified spontaneous emission (ASE) emerging from the amplifier 18, it may be necessary to insert an optical gate 19, timed to match the output of the optical pulse, after the amplifier 18. The ASE is continuous and its high mean power may generate sufficient backscatter to mask the weaker backscatter from localised fibre sections, i.e. it could degrade the spatial resolution of the instrument. A further amplifier (EDFA) 20 might be used if the peak power returning from the pulse spreading network 3 is sufficiently below the non-linear limit.

Figure 5B:
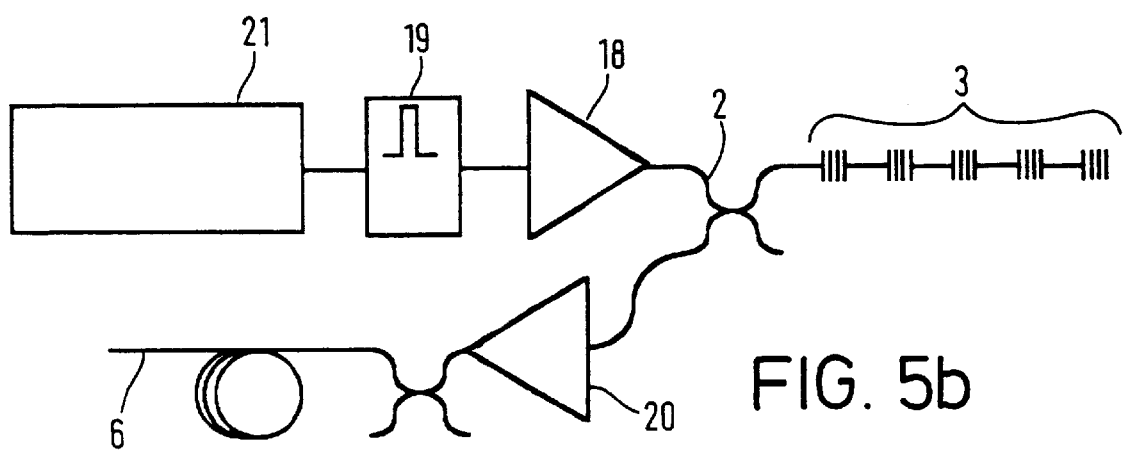

A further alternative shown in FIG. 5b is a superfluorescent fibre source 21, which uses amplified spontaneous emission (ASE) of a fibre amplifier. In is this case, an output having several tens of nm spectral width and a total power across the spectrum of several tens of mW is attainable. An external modulator is required to convert the ASE into a short broadband (but still low power) optical pulse. This pulse may then be amplified, as in the case of the LED 16, by means of an optical amplifier 18, e.g. an Erbium-doped fibre amplifier (EDFA). If required, the pulse train created by the pulse spreading network 3 can be further amplified prior to being launched in the fibre 6 to be measured. A benefit of the latter arrangement is that the intensity of the pulse entering the pulse spreading network 3 can be kept well below the non-linear limits and subsequently amplified.

A further advantage of using two separate networks 3, 7 for spreading and then re-forming the optical pulse is that they can be separately optimised and this is especially important where the source 16, 21 is of a similar design to those illustrated in FIGS. 5a and 5b. Thus it is desirable to ensure that the re-forming transformation effected on the backscatter signals is accurate, i.e. that the delays applied to each spectral component are exactly as required to re-synchronise the waveforms. However, if the reflectors $3_1, 3_2, \ldots, 3_{n-1}, 3_n$ used in the pulse spreading network 3 are of the same design as those in the pulse re-forming network 7, then it is possible for light on the edge of the reflection spectrum of one grating to be partially reflected by that grating and partially by another in the network 3. This effect could lead to a slight blurring of the spatial resolution of the instrument.

The problem just described may be overcome, however, by arranging for the spectral widths of the reflectors $3_1, 3_2, \ldots, 3_{n-1}, 3n$ to be different. Preferably, the reflectors $3_1, 3_2, \ldots, 3_{n-1}, 3_n$ forming the pulse spreading network 3 should possess a somewhat narrower spectrum than those in the re-forming network 7. In this way, the spectrum illuminating the fibre 6 to be measured will consist of a series of peaks with a small separation between peaks where there is substantially no optical energy. If the spectrum of the reflectors $7_n, 7_{n-1} \ldots, 7_2, 7_1$ in the re-forming network 7 are wider than those of the spreading network 3, the energy at each spectral feature can be reflected efficiently by a single reflector in the re-forming network 7, thus avoiding any loss of spatial resolution. Although the same result would be achieved by arranging for the spectral width of the reflectors $3_1, 3_2, \ldots, 3_{n-1}, 3_n$ in the pulse spreading network 3 to be broader than those in the re-forming network 7, the latter approach is less efficient. Thus, using narrower reflectors $3_1, 3_2, \ldots, 3_{n-1}, 3_n$ in the pulse spreading network 3 ensures that only light which can be collected efficiently by the re-forming network 7 is launched into the fibre 6. In this way the peak power handling of the fibre 6 to be measured is used most profitably. In addition, where the light reflected from the pulse spreading network 3 is amplified prior to being launched into the fibre 6 to be measured (e.g. as in FIGS. 1d, 5a and 5b), only light which will be used for the measurement is amplified, an arrangement which reduces the pump power required in the optical amplifiers 12, 18, 20 and thus improves the overall efficiency of the system.

However, in order to reduce the number of components required to manufacture the OTDR or OTDR sensor instrument, it is desirable to employ an arrangement where the same network is used both to spread the initial pulse into time-shifted spectral and components and to reconstitute the resulting backscatter waveforms. A further benefit is that the reconstitution should then be exact, since the same networks are used for both functions and thus the delay and filter characteristics for spreading and reconstitution are identical.

Figure 6A:
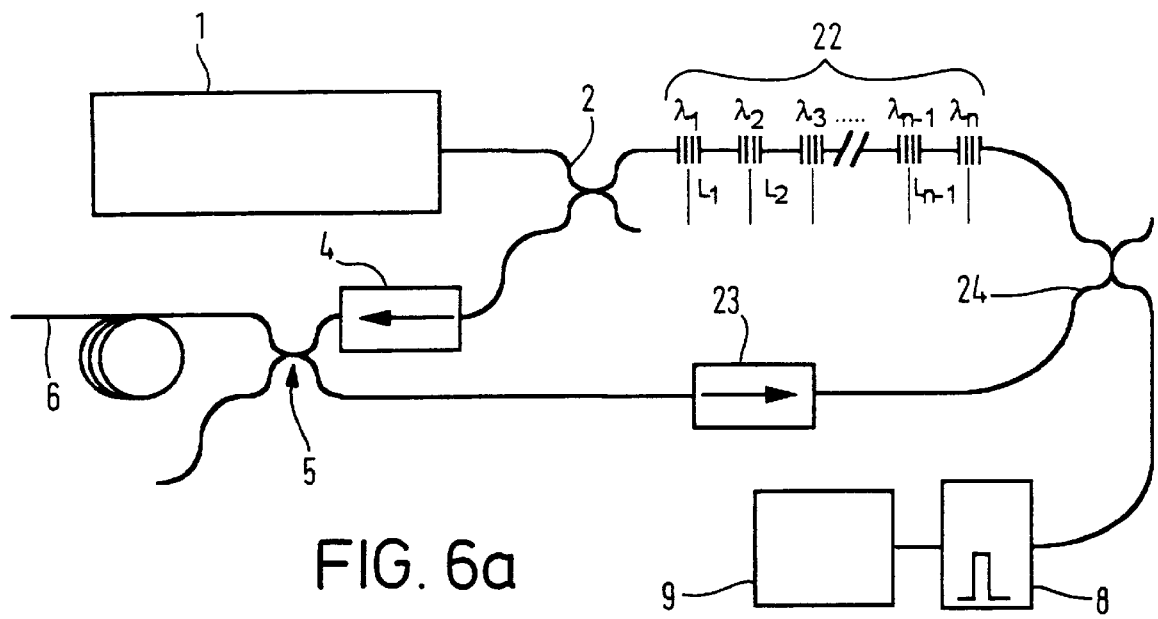
FIGS. 6a, 6b and 7 show respective schematic diagrams of alternative apparatus embodying the present invention.
Figure 6B:
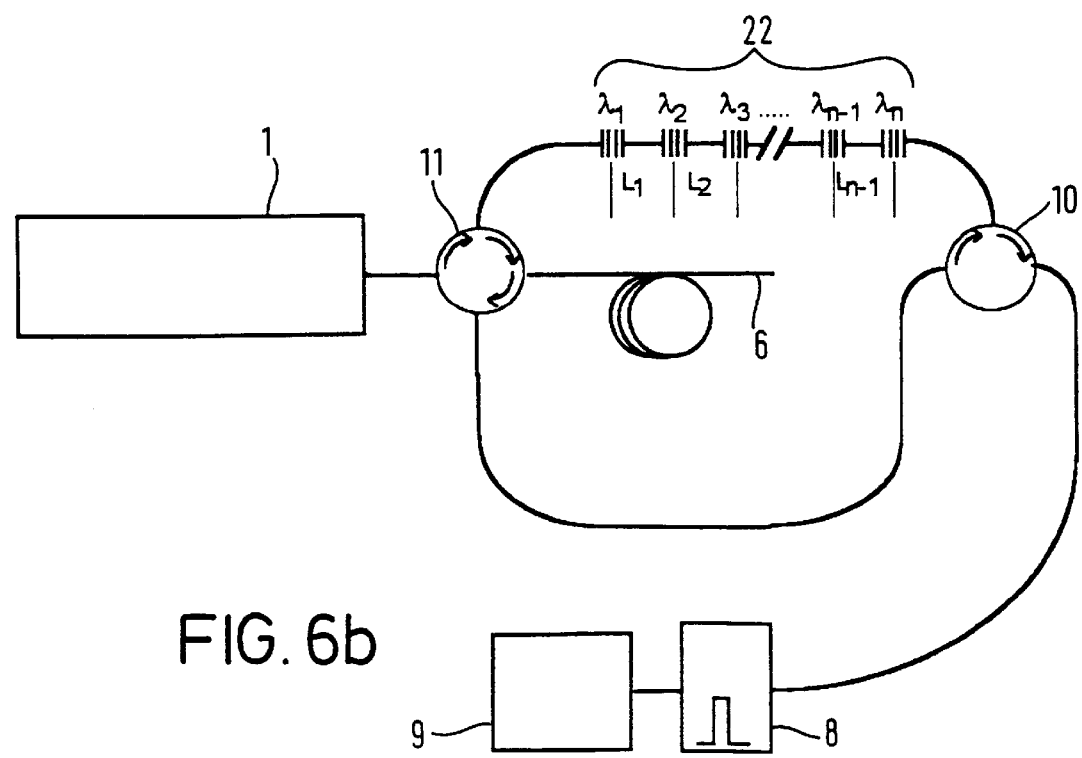
Figure 7:
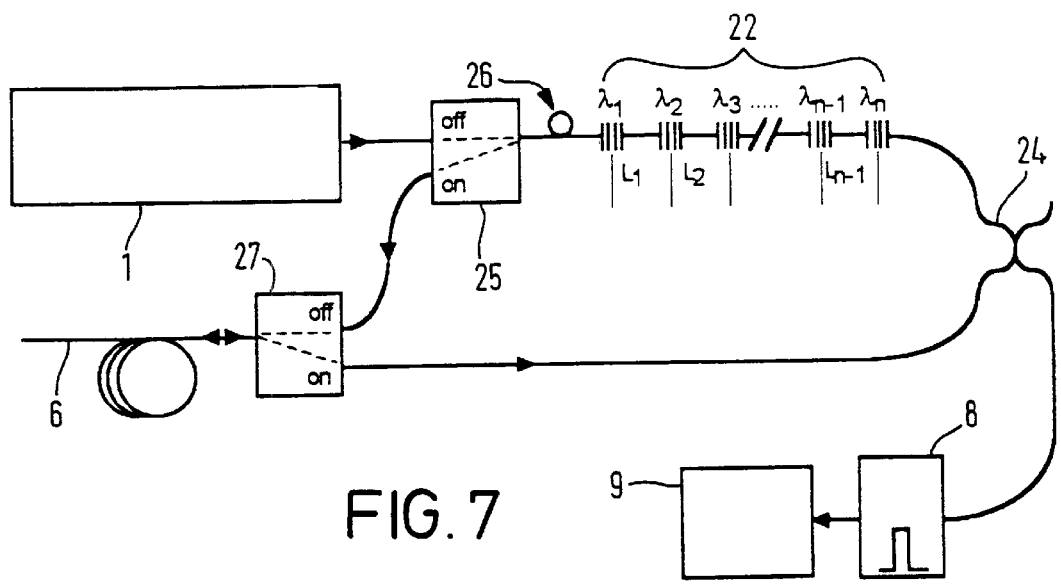

Three such arrangements are shown in FIGS. 6a, 6b and 7. FIG. 6a shows a passive arrangement which has the benefit of considerable simplification over, for example, the arrangements of FIG. 1. The arrangement of FIG. 6a may be understood by considering a broadband pulse emitted by the source 1, a fraction of which reaches a pulse-spreading and re-forming network 22 via the first directional coupler 2. On reflection from this network 22, a further fraction of the pulse energy (now divided into a series of pulses of differing wavelengths $\lambda_1, \lambda_2, \ldots, \lambda_{n-1}, \lambda_n$) is launched into the fibre 6 to be measured through the isolator 4 and second directional coupler 5. The backscatter signals traverse the directional coupler 5 in the return direction and are directed, via a second isolator 23 and a third directional coupler 24, to the far end of the pulse spreading and re-forming network 22. The additional optical isolator 23 is provided so as to prevent any residual spectral components not reflected by the spreading and re-forming network 22 from reaching the test fibre 6. Clearly, if the pulse spreading and re-forming network 22 allows no transmission of any spectral component of the broadband probe pulse, then the additional isolator 23 might be dispensed with.

The earliest spectral components of the backscatter signal to be reflected by the network 22 are the latest to be have been reflected when the probe pulse was spread by this same network 22. The pulse spreading and re-forming network 22, when illuminated in the reverse direction, thus removes the time/wavelength spread of the optical signals which was effected when the probe pulse was reflected from its first extremity.

The benefit of using the same network 22 for spreading and re-forming the optical signals is that a far greater tolerance to variations in the timing between reflectors is permitted: the exact value of the delays is immaterial to the fidelity of the reconstruction process provided that it is greater than the desired spatial resolution of the OTDR.

An optical gate 8 is provided in FIGS. 6a, 6b and 7 to eliminate any residual light from the source 1 not reflected by the reflector network 22 and to prevent such transmitted light from reaching the receiver 9: receivers in OTDR are in general very sensitive and unable to withstand strong overloads without saturation effects which can severely distort the beginning of the backscatter signals.

The loss in signal level caused by the multiple passes through the directional couplers 2 and 5 prior to the probe pulse train being launched into the fibre 6 under test can be compensated by the addition of an optical amplifier (not shown) placed between the two couplers 2, 5, in a similar way to that illustrated in FIG. 5. Although the most efficient splitting ratio for the couplers is 50%/50%, if ample source power is available, it is preferable to modify the splitting ratio of the directional coupler 5 in such a way that the transmission of the backscatter signal from the fibre 6 towards the directional coupler 24 is enhanced (to, say, 90%) at the expense of the transmission efficiency from the directional coupler 2 to the fibre 6 to be measured (which would then fall to say 10%).

FIG. 6b illustrates a variant of the passive coupler arrangement of FIG. 6a, in which the directional couplers 2, 5, 24 have been replaced by circulators 10, 11. This arrangement is much more efficient in terms of optical energy than that of FIG. 6a, although its component cost is likely to be substantially higher.

Instead of couplers 2, 5, 24 or circulators 10, 11, active directional switches, such as acousto-optic deflectors (AODs), could be used, which would reduce the transmission losses substantially. Such an arrangement is illustrated in FIG. 7. In this case, a first switch 25, located between the source 1 and the network 22, is held in an OFF state while the pulse passes from the broadband source 1 to the pulse spreading and re-forming network 22. This switch 25 is then placed in an ON state (a delay line 26 is provided between the switch 25 and the network 22 to limit the requirements on the switching speed of the switch 25). A second switch 27, located between the first switch 25 and the fibre 6 to be measured, is also held in the OFF state whilst the series of pulses transit to the fibre to be measured and is then switched to the ON state so that the backscatter can travel efficiently from the fibre 6 to be measured through to the far end of the pulse spreading and re-forming network 22, through the directional coupler 24. The pulse spreading and re-forming network 22 operates in reverse and re-synchronises the backscatter signals whilst it reflects them back towards the directional coupler 24 and thence to the receiver 9. Of course, the directional coupler 24 may be replaced by an optical circulator.

Naturally other types of optical switch, such as integrated-optic switches (such as those based on Mach-Zehnder interferometers) or electro-optic deflection devices, may be used.

The discussion so far, although covering OTDR and sensors, has not described in detail the adaptation of the spread-wavelength technique to distributed sensors. Certain forms of distributed sensors are not well suited to being upgraded as suggested. These are sensors in which the measurement information returning from the fibre sensor naturally occupies a range of wavelengths significantly wider than the spectral width of the probe pulse. One such example is the Raman-based distributed temperature sensor, for which the temperature sensitive information (usually the anti-Stokes band) occupies a considerable wavelength range, typically 50 nm FWHM for a probe wavelength of 1550 nm; moreover, the spectral width of the Raman backscatter signal is, in most systems of practical interest, independent of that of the probe pulse. In this case, if multiple pulses separated in wavelength by a fraction of the spectral width of the Raman signal were launched together, their Raman spectra would substantially overlap and would be difficult to separate by the means indicated above.

However, several types of distributed sensors may be adapted to benefit from the proposed technique; the example described below involves distributed sensors based on the spontaneous Brillouin scattering effect.

The conventional method for distributed temperature sensing using spontaneous Brillouin scattering employs a narrow-band pulsed laser [e.g. P. C. Wait and T. P Newson: "Landau-Placzek ratio applied to distributed fiber sensing" Optics Communications, vol. 122, pp141–146, 1996]. In this case, a pulse (the probe pulse) of narrow-line radiation is emitted and launched into the sensing fibre. The backscatter spectrum contains a principal line (known as Rayleigh backscatter) at the same wavelength as the probe pulse. Other, weaker, lines in the spectrum also exist, notably the Brillouin lines which each have intensities of order $\frac{1}{60}$ of the Rayleigh line for a typical optical fibre at room temperature. At room temperature, the spontaneous Brillouin scattering effect results in two lines of similar intensities situated symmetrically at higher and lower optical frequencies from the Rayleigh line.

The intensities of the Brillouin lines are dependent on temperature and the ratio of the energy in the Brillouin spectrum relative to that of the Rayleigh line (the so-called Landau-Placzek ratio) provides a method of determining the temperature profile with a high degree of rejection of spurious effects, such as those of non-uniform losses along the fibre. In order to measure the Landau-Placzek ratio, it is necessary to use a very narrow line light source to determine the time dependence of the Brillouin backscatter. However, the use of such a source for the reference measurement (i.e. that of the Rayleigh backscatter) results in serious interference effects, known as fading or coherent Rayleigh noise [P. Healey, "Fading in heterodyne OTDR", Electronics Letters vol. 20, pp30–32, 1984]. In order to eliminate the coherent Rayleigh noise it necessary either to use a separate broadband source or to repeat the Rayleigh measurement with the source wavelength adjusted to many different values in order to average out the distortion caused by the fading effects. Either solution severely complicates the design of the instrumentation.

In spite of these difficulties, the measurement of temperature profiles using the spontaneous Brillouin method offers significant benefits over the prior art Raman method.

In order to employ Brillouin scattering in a distributed sensor to which an embodiment of the present invention is applied, the optical spectrum must be widened whilst retaining the ability to resolve very fine detail within this wider spectrum. Thus, rather than using a source containing a single, narrow, spectral line, a source containing a large number of such lines is proposed. These lines are separated from each other by a sufficient extent that the Brillouin scattering which they generate remains distinct from the Rayleigh backscatter and from the other spectral lines present in the source output. In the case of an operating wavelength of order 1550 nm, the frequency separation between adjacent lines must be of order. 22 GHz (equivalent to a wavelength separation of approximately 0.17 nm).

The use of a multi-line source for Brillouin backscatter measurements in itself allows the limitation on launch power attributable to the onset of stimulated Brillouin scattering to be overcome since the threshold for the Brillouin process applies individually to each line within the source spectrum. The combined power in all lines of a multi-line source can be many times that of a single line: thus within the bandwidth of an Erbium-doped fibre amplifier (typically 30 nm) more than one hundred lines can be accommodated if the latter are spaced by 0.17 nm. The next limitation on permissible launch power is then the onset of stimulated Raman scattering. The Raman limitation is addressed in the same way as was described above in relation to Rayleigh OTDR measurements, i.e. by arranging for various parts of the optical spectrum forming the probe pulse to travel at slightly different times and thus ensure that the peak intensity within the fibre is reduced below the threshold for non-linear optical effects. When applied to the present approach, a source is required whose spectrum contains many separate lines, each very narrow, and preferably separated by twice the Brillouin frequency shift. It is then necessary to provide an optical filter to separate all of the Brillouin lines from all of the Rayleigh lines, i.e. a filter matched to the optical source. If the spectral content of the source and of the discrimination filter are periodic in wavelength (as would be the case with an interferometric filter, such as a Fabry-Perot etalon or a Mach-Zehnder Interferometer), then all such lines would be separated simultaneously provided that the periodicity is the same for both filters and that their transmission bands are maintained (for example by means of active feedback control) in a fixed wavelength relationship.

Figure 8A:
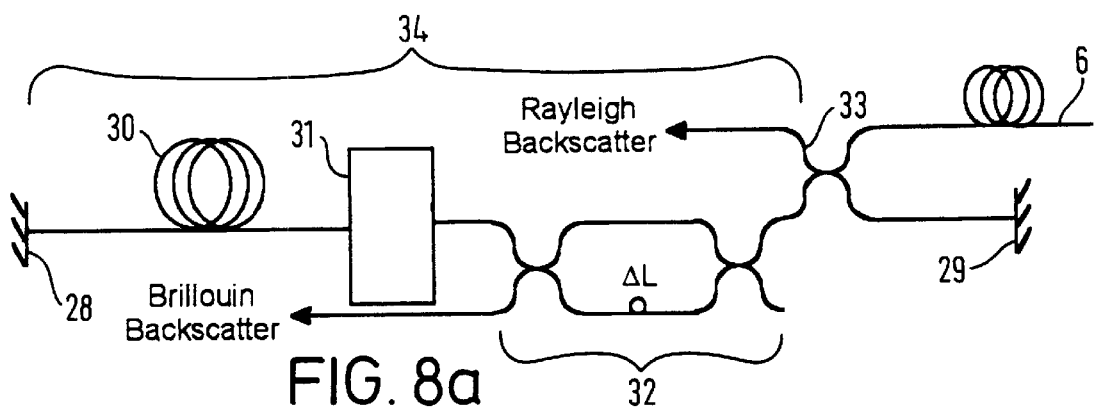
FIGS. 8a and 8b show respective schematic diagrams of apparatus which can be used in conjunction with apparatus embodying the present invention.
Figure 8B:
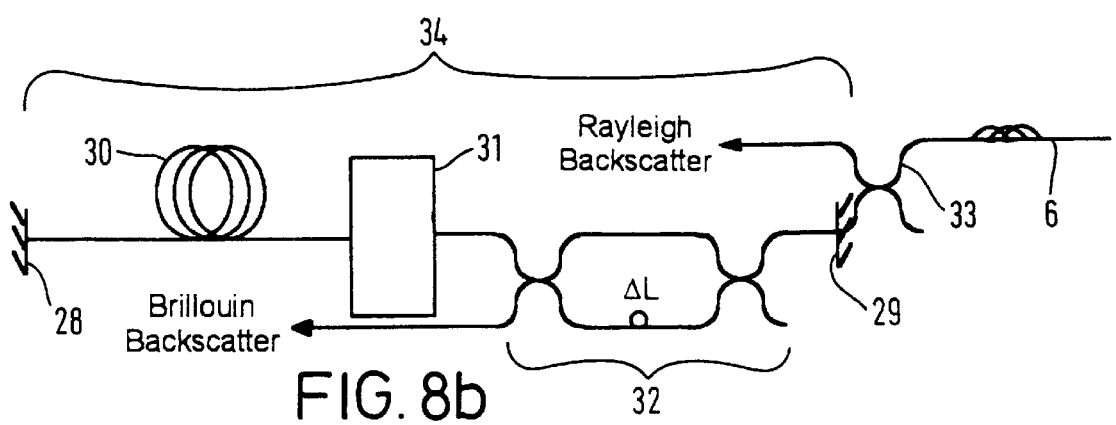

One configuration which meets the description outlined above is illustrated-in FIGS. 8a and 8b, in which a laser 34 is formed in a cavity limited by mirrors 28 and 29, which are both designed for high reflectance at the operating wavelength. The gain medium 30 is illustrated as an optical fibre, which preferably takes the form of an Erbium-doped single mode fibre operating at around 1550 nm. However, other operating wavelengths where single mode fibres exist may be used, such as 1064 nm and 1300 nm for which fibres doped with Nd and Pr ions, respectively, are suitable. Moreover, the gain medium 30 need not be restricted to rare-earth doped optical fibres; for example a semiconductor amplifier or a glass laser made from bulk-optic components could be used.

As shown, the pump energy may be launched into the gain medium 30 through the input mirror 28 (which therefore must exhibit high transmission at the pump wavelength, but a high reflectivity at the lasing wavelengths). Alternatively, where optical pumping of a rare-earth doped fibre amplifying medium is employed, the pump energy might be launched into the gain medium 30 by means of a dichroic beamsplitter (or its all-fibre equivalent, a wavelength-division multiplexing coupler, as supplied, for example, by the British company Sifam).

A Q-switch device 31 is provided at the opposite end of the gain medium 30 from the mirror 28 so as to prevent laser operation until such time as a trigger pulse is received. The Q-switch 31, when in the OFF state, introduces a high loss in the laser cavity 34, which is substantially reduced when it is switched to the ON state. In this way, the energy stored in the form of a population inversion whilst the Q-switching element is in the OFF state is released in a high-intensity, short-duration pulse. A suitable device to form the Q-switch 31 is an acousto-optic modulator in which the interaction of an hypersonic wave with an optical medium creates an electrically-controlled grating which may be used to deflect the optical beam traversing that medium from one angle to another. All but one of the deflection angles are arranged to introduce a high loss within the cavity 34 and thus to suppress the lasing action.

The elements described so far are common to Q-switched lasers. The configuration of FIGS. 8a and 8b further comprises a wavelength-selective element 32, consisting (in this example) of a fibre-optic Mach-Zehnder interferometer, for inducing the laser 34 to operate preferentially at wavelengths where the transmission of the selective element 32 is highest. The wavelength selectivity is achieved by arranging that the two arms of the Mach-Zehnder interferometer 32 are unbalanced (i.e. are of unequal length). Those wavelengths for which this path-length imbalance is a multiple of the optical wavelength are transmitted, whereas a minimum in transmission exists where this imbalance is an odd multiple of the half-wavelength. The transmission function of such an interferometric device 32 is thus periodic. Given the number of passes that the laser emission is subjected to whilst the pulse intensity builds up, the laser output will take the form of a comb spectrum, with a frequency separation equal to that of the free-spectral range of the interferometer 32. The sharpness of the comb function depends on the number of round trips in the cavity to which the light is subjected whilst the pulse is built up from noise. It will also depend on the round-trip losses within the cavity. The laser 34 must be designed to ensure that the spectral width of individual lines within are less than approximately 1.5 GHz, which is sufficiently narrow for the Brillouin signals it generates to be readily separated from the Rayleigh backscatter.

Where the frequency shift between the Rayleigh and Brillouin lines must be measured accurately, then it is necessary for the width of individual lines to be of similar order, or narrower, than the width of the spontaneous Brillouin emission itself, i.e. a few tens of MHz. The Brillouin frequency shift is sensitive to a number of parameters, some of which relate to the composition of the fibre. Other factors which affect the Brillouin frequency shift include temperature and strain. Since the temperature may also be determined from the Landau-Placzek ratio, the additional knowledge of the frequency shift allows the temperature and strain to be determined simultaneously and unambiguously.

In order for the frequency separation to be equal to twice the Brillouin shift, for an operating wavelength of 1550 nm, the path length imbalance between the two arms of the fibre-optic Mach-Zehnder interferometer 32 must be of order 9.6 mm. Of course other types of interferometer may be envisaged, such as a Michelson design.

In the arrangement illustrated in FIGS. 8a and 8b, the output of the laser 34 is taken through directional coupler 33, the splitting ratio of which is selected to provide the desired output coupling. Alternatively, mirror 29 could have been made partially reflective and the light re-launched into an output fibre, as illustrated in FIG. 8b. An additional benefit of the arrangement of FIG. 8a or 8b (or equivalent arrangements) is that the Mach-Zehnder interferometer 32 also serves as a filtering device to separate the Brillouin backscatter from the Rayleigh backscatter. Since the same device 32 is used, its filtering characteristics are automatically locked to the laser emission and there is no need for a tracking circuit to lock independent optical fibres to each other, which given the relative resolution required (about 1 part in $10^6$) can be difficult to stabilise. A filtered output (marked Brillouin backscatter) is obtained which has been largely rid of the dominant Rayleigh contribution; this output must be converted to an electrical signal in an optical receiver and then digitised. The unused output of coupler 33 provides a separate Rayleigh backscatter signal which, when fed to a suitable optical receiver and signal acquisition circuit, provides the reference waveform required to calculate the Landau-Placzek ratio.

A problem in achieving stable lasing can occur in a Q-switched laser (at least in an Erbium-doped fibre laser) owing to the phenomenon of homogeneous line broadening, which results in competition for the gain between the operating wavelengths. This problem has been addressed by Chow, Town et al in "Multiwavelength Generation in an Erbium-Doped Fiber Laser Using In-Fiber Comb Filters", IEEE Photonics Technology Letters, Vol. 8, No. Jan. 1, 1996, and by Yamashita and Hotate in "Multiwavelength erbium-doped fiber laser using intracavity etalon and cooled by liquid nitrogen", Electronics Letters, Jul. 4, 1996, Vol. 32, No. 14, both of which propose reducing the effect of homogeneous broadening by cooling the fibre to cryogenic temperatures. An alternative approach is suggested by Graydon et al in "Triple-Frequency Operation of an Er-Doped Twincore Fibre Loop Laser", IEEE Photonics Technology Letters, Vol. 8, No. Jan. 1, 1996, in which an artificial inhomogeneous broadening process is employed to allow independent laser operation. It seems that techniques such as these would need to be employed in a Q-switched laser.

A further alternative, described by Cowle et al in "Brillouin/Erbium Fiber Lasers", Journal of Lightwave Technology, Vol. 15, No. Jul. 7, 1997, involves generating the comb by means of multiple-order stimulated Brillouin scattering.

Figure 9:
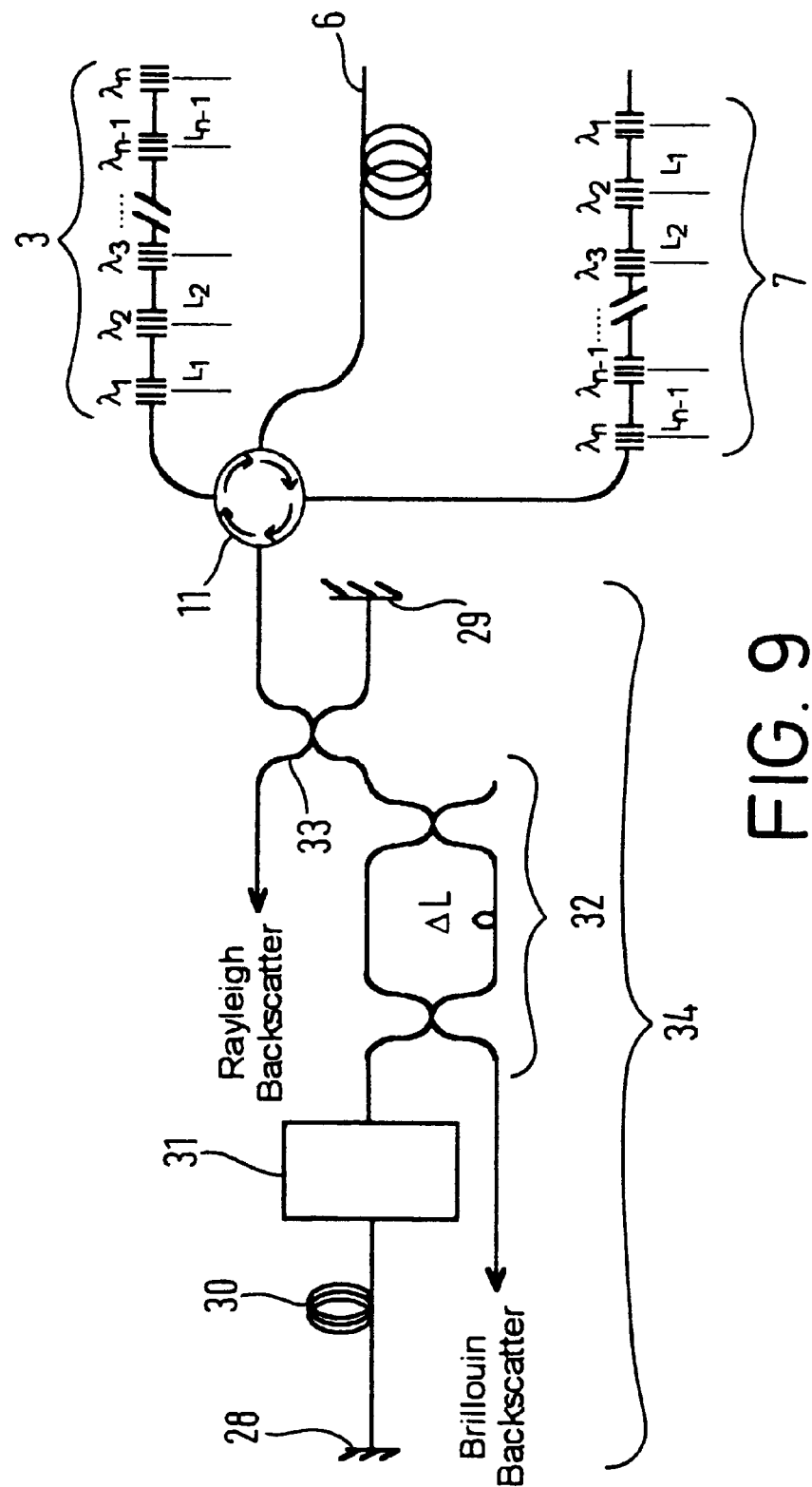
FIG. 9 shows a schematic diagram of further apparatus embodying the present invention.

The comb spectrum generated by such a laser 34 may then be presented to a pulse-spreading network 3, as illustrated in FIG. 9. The latter shows an embodiment using two separate networks 3, 7 for spreading and re-forming the pulses, linked to the laser 34 and the sensing fibre 6 by a four-port circulator 11. It will be readily apparent that most of the variants illustrated in connection with the OTDR aspects (FIGS. 1*a*–*e*, FIGS. 5–7) of the invention can also be applied to the distributed sensing aspect. In particular, the optical energy could be directed between the source 1, the pulse forming networks 3, 7 and the sensing fibre 6 using optical fibre couplers or bulk-optical rather than the circulator shown in FIG. 9, or combinations of these technologies. Actively-controlled optical switches, such as acousto-optic deflectors or integrated-optic switches could also be used to perform the functions of the optical circuit elements shown in FIG. 9.

In some cases, it may be desirable or essential to use an optical filter separate from, or in addition to, that within the laser cavity 34. This may be necessary if the intra-cavity filter is unable to provide sufficient rejection of the Rayleigh lines or if its frequency discrimination is inadequate. The latter eventuality is especially likely if the frequency shift relative to the Rayleigh must be measured, for example in order to measure strain and temperature. In this case an optical filter with a very high resolution will be required.

Where two or more filters are used together in a distributed sensor, the filters must be locked to each other using a feedback arrangement which detects the relative filter frequencies and adjusts their relative passbands.

The technology of fibre gratings is now sufficiently advanced that a source such as illustrated in FIGS. 5*a* and 5*b* could be manufactured with sufficiently narrow lines that the resulting comb spectrum could be used directly as a multi-line source for a Brillouin distributed sensor. The requirement on each line is a linewidth of order 1 to 2 GHz which translates into a minimum grating length of 0.1 to 0.2 m. Such gratings can be manufactured with presently-available technology.

Other OTDR based sensors, such as those which measure changes of fibre loss and infer the value of external measurands from these changes, can easily be adapted. Equally the method can be applied to sensors based on discrete reflectors at intervals along the fibre.

Thus a method and apparatus embodying the present invention can overcome the limitations imposed by the onset of non-linear effects on the peak power which can be launched into optical fibres and can thus enhance the performance of OTDRs or OTDR-based sensors. It is particularly advantageous when applied to instruments which do not require coherent detection receivers, but can be used in conjunction with such receivers.

What is claimed is:

1. An optical time domain reflectometry method in which a plurality of pulses of optical radiation, having different respective wavelengths and delayed by known amounts of time relative to one another such that adjacent pulses do not overlap, are launched into an optical fibre (6) of interest and optical radiation backscattered from the fibre (6) is detected to produce electrical output signals, the said backscattered optical radiation being processed before detection so as to remove the effect thereon of the relative time delays between the said plurality of pulses; characterised in that the said plurality of pulses is derived from a pulse of optical radiation in a preselected wavelength band, each of the said pulses having a peak power less than the power at which non-linear effects begin to occur in the said optical fibre (6).

2. A method as claimed in claim 1, wherein the said pulse of optical radiation in a preselected wavelength band is emitted by a broadband source containing a plurality of different wavelengths.

3. A method as claimed in claim 1, wherein there are n pulses in the said plurality, where n is an integer greater than or equal to 2.

4. A method as claimed in claim 1, for use in characterising the said optical fibre (6) of interest.

5. A method as claimed in claim 1, for use in sensing respective values of a physical parameter at different locations along the said optical fibre (6) of interest.

6. A method as claimed in claim 5, wherein the part of the said backscattered optical radiation which is used to produce the said output signals comprises that in respective spectral bands resulting from spontaneous Brillouin scattering in the optical fibre (6) of the said plurality of pulses of optical radiation.

7. Optical time domain reflectometry apparatus comprising means operable to launch a plurality of pulses of optical radiation, delayed by known amounts of time relative to one another such that adjacent pulses do not overlap, into an optical fibre (6) of interest and detection means (9) operable to produce electrical output signals in response to optical radiation backscattered from the fibre (6); characterised by:

source means (1) for emitting a pulse of optical radiation in a preselected wavelength band;

pulse spreading means (3; 22), connected to receive the said optical radiation emitted from the said source means (1) and operable to derive therefrom the said plurality of pulses such that the pulses of the said plurality have different respective wavelengths and a peak power less than the power at which non-linear effects begin to occur in the said optical fibre (6), the said pulse spreading means (3; 22) being connected to launch the said plurality of pulses into the said optical fibre (6); and pulse re-forming means (7; 22) connected, between the said optical fibre (6) and the said detection means (9), to intercept backscattered optical radiation from the said optical fibre (6), the said pulse re-forming means (7; 22) being operable to process said backscattered optical radiation so as to remove the effect on that backscattered optical radiation of the relative time delays between the said plurality of pulses and to output the processed backscattered optical radiation to the said detection means (9).

8. Apparatus as claimed in claim 7, wherein the said source means (1) comprise a broadband source containing a plurality of different wavelengths.

9. Apparatus as claimed in claim 7, wherein there are n pulses in the said plurality, where n is an integer greater than or equal to 2.

10. Apparatus as claimed in claim 8, wherein the said pulse spreading means (22) also constitute the said pulse re-forming means (22).

11. Apparatus as claimed in claim 8, wherein the said pulse spreading means (3; 22) comprise a serial reflective network.

12. Apparatus as claimed in claim 8 wherein the said pulse re-forming means (7; 22) comprise a serial reflective network.

13. Apparatus as claimed in claim 11, wherein the said serial reflective network comprises a plurality of serially-connected wavelength-selective reflectors ($3_1, 3_2, \ldots, 3_n$; $7_1, 7_2, \ldots, 7_n$).

14. Apparatus as claimed in claim 13, wherein the said reflectors ($3_1, 3_2, \ldots, 3_n$; $7_1, 7_2, \ldots, 7_n$) comprise gratings.

15. Apparatus as claimed in claim 13, wherein there are n reflectors ($3_1, 3_2, \ldots, 3_n$; $7_1, 7_2, \ldots, 7_n$).

16. Apparatus as claimed in claim 13, wherein at least some of the reflectors ($3_1, 3_2, \ldots, 3_n$; $7_1, 7_2, \ldots, 7_n$) are connected by amplifying fibre sections (3a).

17. Apparatus as claimed in claim 13 wherein, when the pulse spreading means (3) are distinct form the said pulse re-forming means (7), the said reflectors ($3_1, 3_2, \ldots, 3_n$) of the pulse spreading means (3) have different spectral widths to the reflectors ($7_1, 7_2, \ldots, 7_n$) of the pulse re-forming means (7).

18. Apparatus as claimed in claim 17, wherein the spectral widths of the reflectors ($3_1, 3_2, \ldots, 3_n$) of the said pulse spreading means (3) are narrower than those of the reflectors ($7_1, 7_2, \ldots, 7_n$) of the pulse re-forming means (7).

19. Apparatus as claimed in claim 13 wherein at least some of the said reflectors ($3_1, 3_2, \ldots, 3_n$) of the pulse spreading means (3) are selected so as to have differing respective spectral widths such that all of the pulses derived by the pulse spreading means (3) are of approximately equal amplitude.

20. Apparatus as claimed in claim 8, wherein the said pulse spreading means (3; 22) comprise a parallel transmissive or reflective network.

21. Apparatus as claimed in claim 8 wherein the said pulse re-forming means (7; 22) comprise a parallel transmissive or reflective network.

22. Apparatus as claimed in claim 20, wherein the said parallel transmissive network comprises a wavelength division demultiplexer (13b; 17b), a wavelength division multiplexer (13a; 17a) and a plurality of fibre delay lines (13c; 17c) connected between the said wavelength division demultiplexer (13b; 17b) and the said wavelength division multiplexer (13a; 17a).

23. Apparatus as claimed in claim 20, wherein the said parallel reflective network comprises a wavelength division demultiplexer (13b; 17b) and a plurality of fibre delay lines (13c; 17c) connected between the said wavelength division demultiplexer (13b; 17b) and reflective means.

24. Apparatus as claimed in claim 22, wherein there are n fibre delay lines (13c; 17c).

25. Apparatus as claimed in claim 8 designed so as to substantially avoid the occurrence of non-linear effects in the pulse spreading means (3; 22).

26. Apparatus as claimed in claim 25, wherein the peak power of optical radiation entering the said pulse spreading means (3; 22) is restricted to a level below that at which non-linear effects occur and further comprising amplifying means (20) for amplifying the pulses produced by the said pulse spreading means (3; 22).

27. Apparatus as claimed in claim 8 for use in sensing respective values of a physical parameter at different locations along the optical fibre (6), wherein the said optical fibre (6) is deployed through a region of interest.

28. Apparatus as claimed in claim 27, wherein the said detection means (9) are operable to detect backscattered optical radiation in respective spectral bands resulting from spontaneous Brillouin scattering in the optical fibre (6) of the said plurality of pulses of optical radiation.

29. Apparatus as claimed in claim 28, wherein the said source means (1) can emit optical radiation in more than one spectral band, such that each spectral band is narrow and is separated from the or each of the others such that the spectral bands resulting from spontaneous Brillouin scattering in the fibre (6) remain distinct from the Rayleigh spectral band and other spectral bands present in the source means (1).

30. Apparatus as claimed in claim 29, wherein the said source means (1) is formed by a laser cavity (34) defined between a pair of mirrors (28, 29) and further comprising, in series between the said mirrors (28, 29), a gain medium (30), a Q-switch device (31) and a wavelength-selective element (32) having at least two pass bands.

31. Apparatus as claimed in claim 29, wherein the said source means (1) emit a spectrum in which the spectral bands are substantially periodic.

32. Apparatus as claimed in claim 31, wherein the spectral bands have a period which is approximately twice the Brillouin wavelength shift.

33. Apparatus in claim 30 wherein the said wavelength-selective element (32) also serves to separate out the Brillouin backscatter signals and the Rayleigh backscatter signals.

34. An optical time domain reflectometry apparatus usable with a selected optical fiber comprising:

a radiant energy source for emitting at least one pulse of optical radiation in a preselected wavelength band;

a pulse spreading network coupled to receive the at least one pulse of optical radiation emitted from the source and operable to form therefrom a plurality of pulses such that the pulses of the plurality have different respective wavelengths and a peak power less than the power at which non-linear effects begin to occur in the optical fiber wherein the network couples the plurality of pulses into the optical fiber;

an optical detector; and a pulse re-forming network coupled between the optical fiber and the detector to intercept backscattered optical radiation from the optical fiber wherein the pulse re-forming network processes the backscattered optical radiation so as to remove the effect on that backscattered optical radiation of the relative time delays between the members of the plurality of pulses and to output the processed backscattered optical radiation to the detector.

35. Apparatus as in claim 34 wherein the source comprises a broadband source which emits a plurality of different wavelengths.

36. Apparatus as in claim 35 wherein there are n pulses in the plurality, where n is an integer greater than or equal to 2.

37. Apparatus as in claim 35 wherein the pulse spreading network comprises the pulse re-forming network.

38. Apparatus as claimed in claim 35 wherein the pulse spreading network comprises a serial reflective network.

39. Apparatus as in claim 38 wherein the pulse re-forming network comprises a serial reflective network.

40. Apparatus as in claim 39 wherein at least one of the said serial reflective networks comprises a plurality of serially-connected wavelength-selective reflectors.

41. Apparatus as in claim 40 wherein the reflectors comprise gratings.

42. Apparatus as in claim 40 wherein the at least one network comprises n reflectors.

43. Apparatus as in claim 40 wherein at least some of the reflectors are connected by amplifying fiber sections.

44. Apparatus as in claim 40 wherein the reflectors of the pulse spreading networks have different spectral widths than the reflectors of the pulse re-forming network.

45. Apparatus as in claim 44 wherein the spectral widths of the reflectors of the pulse spreading network are narrower than those of the reflectors of the pulse re-forming means network.

46. Apparatus as in claim 40 wherein at least some of the reflectors of the pulse spreading network are selected so as to have differing respective spectral widths such that all of the pulses derived by the pulse spreading network are of approximately equal amplitude.

47. Apparatus as in claim 35 wherein the pulse spreading network comprises one of a parallel transmissive or reflective network.

48. Apparatus as in claim 47 wherein the pulse re-forming network comprises one of a parallel transmissive or reflective network.

49. Apparatus as in claim 48 wherein the parallel transmissive network comprises a wavelength division demultiplexer, a wavelength division multiplexer and a plurality of fiber delay lines connected between the wavelength division demultiplexer and the wavelength division multiplexer.

50. Apparatus as claimed in claim 48 wherein the parallel reflective network comprises a wavelength division demultiplexer and a plurality of fiber delay lines.

\* \* \* \* \*